(12) United States Patent
Zeng et al.

(10) Patent No.: US 11,653,332 B2
(45) Date of Patent: May 16, 2023

(54) RESOURCE ALLOCATION METHOD AND COMMUNICATIONS DEVICE

(71) Applicant: HUAWEI TECHNOLOGIES CO., LTD., Guangdong (CN)

(72) Inventors: Yongbo Zeng, Beijing (CN); Yu Cai, Beijing (CN); Jian Wang, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 351 days.

(21) Appl. No.: 17/059,063

(22) PCT Filed: May 28, 2019

(86) PCT No.: PCT/CN2019/088717
§ 371 (c)(1),
(2) Date: Nov. 25, 2020

(87) PCT Pub. No.: WO2019/228321
PCT Pub. Date: Dec. 5, 2019

(65) Prior Publication Data
US 2021/0212023 A1    Jul. 8, 2021

(30) Foreign Application Priority Data
May 28, 2018  (CN) .......................... 201810524599.7

(51) Int. Cl.
*H04W 72/02*      (2009.01)
*H04W 72/04*      (2009.01)
(Continued)

(52) U.S. Cl.
CPC ............. *H04W 72/02* (2013.01); *H04W 4/40* (2018.02); *H04W 72/0406* (2013.01);
(Continued)

(58) Field of Classification Search
CPC ............. H04W 72/02; H04W 72/0406; H04W 72/0446; H04W 72/0453; H04W 72/0493; H04W 4/40
See application file for complete search history.

(56) References Cited

U.S. PATENT DOCUMENTS

2016/0295624 A1* 10/2016 Novlan .................... H04L 67/12
2016/0330728 A1* 11/2016 Sorrentino .......... H04W 72/048

FOREIGN PATENT DOCUMENTS

CN          106331980 A     1/2017
CN          106485947 A     3/2017
(Continued)

OTHER PUBLICATIONS

R1-155909, Ericsson, 'Discussion on V2V Scheduling, Resource Pools and Resource Patterns', Oct. 4-10, 2015, pp. 1-6. (Year: 2015).*
Huawei, HiSilicon, Support of unicast and groupcast for eV2X. 3GPP TSG-RAN WG2 Meeting #101, Athens, Greece, Feb. 26 Mar. 2, 2018, R2-1801903, 6 pages.
(Continued)

*Primary Examiner* — Melvin C Marcelo
(74) *Attorney, Agent, or Firm* — Womble Bond Dickinson (US) LLP

(57) ABSTRACT

First configuration information is configured for a second device by a first device. The first configuration information is used to indicate a first time-frequency resource allocated by the first device. The first time-frequency resource is different from a second time-frequency resource that is allocated by the first device to a third device in a same group. The first time-frequency resource comprises a third time-frequency resource and a fourth time-frequency resource. The third time-frequency resource is a time-frequency resource used when the first device receives a message sent by the second device. The fourth time-frequency resource is
(Continued)

a time-frequency resource used when the first device sends a message to the second device. The third time-frequency resource is different from the fourth time-frequency resource. Control information that includes the first configuration information is sent by the first device.

20 Claims, 9 Drawing Sheets

(51) Int. Cl.
*H04W 4/40* (2018.01)
*H04W 72/0446* (2023.01)
*H04W 72/0453* (2023.01)

(52) U.S. Cl.
CPC .............. *H04W 72/0446* (2013.01); *H04W 72/0453* (2013.01); *H04W 72/0493* (2013.01)

(56) References Cited

FOREIGN PATENT DOCUMENTS

| | | | | |
|---|---|---|---|---|
| CN | 107040960 | A | 8/2017 | |
| CN | 107318097 | A | 11/2017 | |
| CN | 107710854 | A | 2/2018 | |
| EP | 3300450 | A1 | 3/2018 | |
| EP | 3787360 | A1 * | 3/2021 | ............ H04W 4/08 |
| WO | 2015032436 | A1 | 3/2015 | |
| WO | 2016178135 | A1 | 11/2016 | |
| WO | 2018021784 | A1 | 2/2018 | |
| WO | 2018027989 | A1 | 2/2018 | |

OTHER PUBLICATIONS

CATT, Huawei, Ericsson, New WID on study on V2X phase 3 based on NR , 3GPP TSG RAN Meeting #78, RP-172369(RP-17xxxx), Lisbon, Portugal, Dec. 18-21, 2017, 6 pages.

* cited by examiner

RESOURCE ALLOCATION METHOD AND COMMUNICATIONS DEVICE

CROSS-REFERENCE TO RELATED APPLICATIONS

This application is a National Stage of International Application No. PCT/CN2019/088717, filed on May 28, 2019, which claims priority to Chinese Patent Application No. 201810524599.7, filed on May 28, 2018. Both of the aforementioned applications are hereby incorporated by reference in their entireties.

TECHNICAL FIELD

The application relates to the communications field, and in particular, to a resource allocation method and an apparatus.

BACKGROUND

Currently, an internet of vehicles e.g., Vehicle to Everything (V2X,) technology is constantly evolving and developing. In internet of vehicles communication, vehicles may communicate with each other by using vehicle-mounted communications devices of the vehicles. Vehicles in a same direction or with a same purpose may be dynamically formed into a vehicle platoon. A set of vehicle-mounted communications devices of vehicles in the vehicle platoon forms a group, and a group management device is responsible for managing the group. The group management device (referred to as a first device below) can perform a function of managing or controlling internal resources of the group. The group management device is a vehicle-mounted device of a vehicle that is in the vehicle platoon and that is responsible for managing the platoon. Group communication includes the following several types of communication: communication between the first device and a device outside the group (e.g., a second device), communication between the first device and a device in the group (e.g., a third device), communication between devices in the group, communication between the device outside the group (e.g., the second device) and the device in the group (e.g., the third device), communication between the first device or the third device and a roadside unit (RSU), and the like.

A prerequisite for the device outside the group to participate in intra-group communication is to join the group. The device outside the group (e.g., the second device) and the group management device (e.g., the first device) need to exchange information with each other, to complete a process of mutual identity confirmation. For example, the second device sends a "group joining request" message to the first device. After correctly receiving the message, the first device sends an acknowledgment message, that is, a "group joining response" to the second device. After the second device correctly receives the "group joining response" message, it may be considered that a group joining process ends. However, according to a current internet of vehicles communication mechanism, when no network side device participates in resource scheduling, a device autonomously selects a resource from a resource pool to send a message in direct communication between devices. Therefore, a resource used for communication between the first device and the second device may conflict with a resource used for communication between the first device and the third device and a resource used for communication between the second device and the third device. As a result, a device outside the group cannot normally communicate with the first device in the group, and consequently the device outside the group cannot join the group or a time for joining the group is delayed.

SUMMARY

Embodiments of the application provide a resource allocation method and an apparatus, to allocate a dedicated time-frequency resource to a joining message between a vehicle-mounted device of a header vehicle and a vehicle-mounted device that is of a vehicle and that has not joined a group, so that the vehicle-mounted device that is of the vehicle and that has not joined the group smoothly joins the group, and a resource using conflict is avoided.

According to at least some embodiments of the application, a resource allocation method is provided, including:

To receive a communication message from a second device and send a communication message to the second device, a first device needs to configure, for the second device, first configuration information used to indicate a dedicated time-frequency resource. The dedicated time-frequency resource may be referred to as a first time-frequency resource herein, the first time-frequency resource is different from a second time-frequency resource, and the second time-frequency resource is a time-frequency resource allocated by the first device to a third device in a same group. The first time-frequency resource includes a third time-frequency resource and a fourth time-frequency resource, the third time-frequency resource is a time-frequency resource used when the first device receives a message sent by the second device, and the fourth time-frequency resource is a time-frequency resource used when the first device sends a message to the second device. In addition, the third time-frequency resource is different from the fourth time-frequency resource. After the first device configures the first configuration information for the second device, the first device may send control information, where the control information includes the first configuration information.

As can be seen from the foregoing technical solution, the embodiments of the application have the following advantages:

The first device configures the first configuration information for the second device, where the first configuration information is used to indicate the first time-frequency resource. The first time-frequency resource is different from the second time-frequency resource allocated by the first device to the third device, the first device and the third device are in the same group, and the first time-frequency resource is allocated by the first device. The first time-frequency resource includes the third time-frequency resource and the fourth time-frequency resource, the third time-frequency resource is the time-frequency resource used when the first device receives the message sent by the second device, and the fourth time-frequency resource is the time-frequency resource used when the first device sends the message to the second device. In addition, the third time-frequency resource is different from the fourth time-frequency resource. Then, the first device sends the control information, where the control information includes the first configuration information. The first device and the second device transmit information by using the first time-frequency resource, and the first device and the third device transmit information and third devices transmit information by using the second time-frequency resource, where the first time-frequency resource does not overlap the second time-frequency resource. Therefore, this avoids a resource conflict with information transmission between the first device and the third device and information transmission between the third devices when the first device and the second device transmit information by using the first time-frequency resource, so that the second device can smoothly join the group.

In at least some embodiments, before the configuring, by a first device, first configuration information for a second device, the method further includes:

The first device may allocate the first time-frequency resource, or the first device may determine the first time-frequency resource. The first time-frequency resource is a time-frequency resource specially allocated to the second device, and the second device may send the communication message to the first device and receive the communication message from the first device by using the first time-frequency resource.

Alternatively, the first device may first configure the first configuration information for the second device, and then allocate the first time-frequency resource to the second device or determine the first time-frequency resource. This is not limited herein.

In an embodiment of the application, because the first device allocates the first time-frequency resource independent of another time-frequency resource, and the first device can divide the first time-frequency resource in a plurality of manners, the first device may receive the communication message from the second device and send the communication message to the second device by using the first time-frequency resource. This not only avoids a conflict between a time-frequency resource used when the first device and the second device receive and send the communication message and a time-frequency resource used by another device, but also provides a plurality of manners of dividing the first time-frequency resource, thereby improving implementability of this solution.

In at least some embodiments, the allocating, by the first device, the first time-frequency resource includes:

The first device may allocate a time-frequency resource. The time-frequency resource may include only the first time-frequency resource, or may include the first time-frequency resource and the second time-frequency resource. The time-frequency resource may alternatively include only the second time-frequency resource. Related content included in the time-frequency resource is not limited herein.

In an embodiment of the application, the time-frequency resource allocated by the first device is divided in a plurality of manners. Therefore, a plurality of manners of dividing the time-frequency resource are provided, thereby improving flexibility of this solution.

In at least some embodiments, the allocating, by the first device, the first time-frequency resource includes:

The first device may allocate the first time-frequency resource in a semi-static reservation manner. Alternatively, the first device may allocate the first time-frequency resource in a dynamic reservation manner. Alternatively, the first device may allocate the first time-frequency resource in a preset fixed allocation manner.

In an embodiment of the application, the first device provides a plurality of manners of allocating the first time-frequency resource, thereby improving implementability of this solution.

In at least some embodiments, the allocating, by the first device, the first time-frequency resource in a preset fixed allocation manner includes:

The first device may allocate a time-frequency resource in at least one basic time unit of the time-frequency resource as the third time-frequency resource, where the third time-frequency resource is used to transmit a first message, and the first message is a message sent by the second device to the first device.

The first device may allocate a time-frequency resource in at least one basic time unit of the time-frequency resource as the fourth time-frequency resource, where the fourth time-frequency resource is used to transmit a second message, and the second message is a message sent by the first device to the second device.

In an embodiment of the application, a method for allocating, by the first device, the first time-frequency resource in the preset fixed allocation manner is provided, thereby improving implementability of this solution.

In at least some embodiments, the configuring, by a first device, first configuration information for the second device includes:

The first device may configure the first configuration information for the second device by indicating time domain resource information of the first time-frequency resource. In this case, all frequency domain resource information indicated by the time domain resource information that is of the first time-frequency resource and that is indicated by the first device may be used to configure the first configuration information for the second device.

In an embodiment of the application, an implementation in which the first device configures the first configuration information for the second device is provided, thereby improving implementability of this solution.

In at least some embodiments, the configuring, by the first device, the first configuration information for the second device by indicating time domain resource information of the first time-frequency resource includes:

The first device may configure the first configuration information for the second device by indicating the time domain resource information of the first time-frequency resource by using a time resource pattern TRP. Unlike another resource indication method in which a plurality of bits need to be used to represent one basic time unit location, when the time domain resource information of the first time-frequency resource is indicated by using the TRP pattern, each bit represents one basic time unit location. Therefore, a quantity of bits of resource configuration information is reduced.

In an embodiment of the application, an implementation of how the first device indicates the time domain resource information of the first time-frequency resource is provided, and a quantity of bits of the resource configuration information can be reduced by indicating the time domain resource information by using the TRP pattern. Therefore, implementability of this solution is improved, and resources used in this solution are reduced.

In at least some embodiments, the configuring, by the first device, the first configuration information for the second device by indicating time domain resource information of the first time-frequency resource includes:

The first device may indicate a time domain resource of the first time-frequency resource, and indicate a frequency domain resource in the time domain resource of the first time-frequency resource based on the indicated time domain resource of the first time-frequency resource.

In an embodiment of the application, another implementation of how the first device indicates the time domain resource information of the first time-frequency resource is provided, thereby improving implementability of this solution.

In at least some embodiments, the configuring, by the first device, the first configuration information for the second device by indicating time domain resource information of the first time-frequency resource includes:

The first device may first indicate time domain resource information of the time-frequency resource by using a time resource pattern TRP, and then may indicate the time domain resource information of the first time-frequency resource by using a time offset parameter. The time offset parameter may be an offset of a start time location of the first time-frequency resource relative to a start time location of the time-frequency resource. This is not limited herein. When the reserved time frequency includes the first time-frequency resource and the second time-frequency resource, because an available range of the time-frequency resource is relatively large, indicating time domain information of the first time-frequency resource by using the relative offset can reduce a quantity of information bits for indicating a time domain resource.

In an embodiment of the application, using the TRP indication manner improves implementability of this solution and reduces resources used in this solution. Using the relative offset based on TRP indication further improves implementability of this solution and reduces resources used in this solution.

In at least some embodiments, the sending, by the first device, control information includes:

The first device may send a master information block-sidelink (MIB-SL) on a broadcast channel, where the MIB-SL may include the control information.

In an embodiment of the application, a carrier that may be used to transmit the control information is provided, to provide an implementation of how to transmit the control information, thereby improving implementability of this solution.

In at least some embodiments, the control information includes configuration information of the time-frequency resource.

In an embodiment, the control information sent by the first device may include different types of configuration information, thereby improving diversity of implementing this solution.

In an embodiment, the control information may include second configuration information, the second configuration information is used to indicate the second time-frequency resource, and the second time-frequency resource is the time-frequency resource allocated to the third device in the same group as the first device.

In an embodiment, the control information sent by the first device may include different types of configuration information, thereby improving diversity of implementing this solution.

In an embodiment, the sending, by the first device, control information includes:

The first device may send sidelink control information SCI, where the SCI may include the control information.

In an embodiment, another carrier that may be used to transmit the control information is provided, to provide an implementation of how to transmit the control information, thereby improving implementability of this solution. In addition, the another carrier that may be used to transmit the control information is provided, thereby also improving flexibility of implementing this solution.

In an embodiment, that the fourth time-frequency resource is the time-frequency resource used when the first device sends the message to the second device includes:

The fourth time-frequency resource may be a time-frequency resource used by the first device to send the second message to the second device in a group reply manner by using the first time-frequency resource. There are at least two second devices. The group reply manner is used for a plurality of first messages. The first device sends one group response in one message or one signal, where the group response includes responses to at least two first messages.

In an embodiment, when the second device sends a relatively large quantity of first messages, the first device sends the second message by using this method, to avoid that an excessively large quantity of second messages are sent and load is excessively high, thereby improving implementability of this solution.

In an embodiment, that the third time-frequency resource is the time-frequency resource used when the first device receives the message sent by the second device, and the fourth time-frequency resource is the time-frequency resource used when the first device sends the message to the second device comprises:

The third time-frequency resource may be a time-frequency resource used when the first device receives the first message sent by the second device at least twice by using the first time-frequency resource, and the fourth time-frequency resource may be a time-frequency resource used when the first device sends the second message to the second device once by using the first time-frequency resource. In other words, the first device may allow the second device to send the first message to the first device at least twice. Further, the first device may configure a maximum quantity of times the first message is sent.

In an embodiment, each second device sends the second message to the first device for a plurality of times, so that a possible resource using conflict can be resolved, thereby improving implementability of this solution.

In an embodiment, a communications device is provided. The communications device serves as a first device and has a function of performing an action of the first device according to one embodiment. The function may be implemented by hardware, or may be implemented by hardware by executing corresponding software. The hardware or the software includes one or more modules corresponding to the foregoing function.

In at least some embodiments, the communications device is a terminal or a chip, where the chip may be a chip disposed inside a terminal, or may be a chip disposed outside the terminal and coupled to the terminal.

An embodiment of the application further provides a computer readable storage medium, including an instruction. When the instruction is run on a computer, the computer is enabled to perform the methods as described herein.

An embodiment of the application further provides a computer program product, including an instruction. When the instruction is run on a computer, the computer is enabled to perform the methods as described herein.

An embodiment of the application provides a chip system. The chip system includes a processor and may further include a memory, and is configured to perform the methods as described herein. The chip system may include a chip, or may include a chip and another discrete device.

An embodiment of the application provides a processor, including at least one circuit, and configured to perform the methods as described herein.

DESCRIPTION OF EMBODIMENTS

Embodiments of the application provide a resource allocation method and system for platoon communication, to allocate a reserved dedicated resource to a vehicle-mounted device of a vehicle that is to join a platoon, so that in a process in which the vehicle that has not joined the platoon joins the vehicle platoon, a resource using conflict is avoided during information transmission between the vehicle that has not joined the platoon and a vehicle in the platoon, and the vehicle that has not joined the platoon smoothly joins the vehicle platoon.

During vehicle platoon communication, vehicles in a same direction or with a same purpose may be dynamically formed into a platoon. A platoon manager, also referred to as a header vehicle (group header), is responsible for managing the vehicle platoon. A vehicle-mounted device of the header vehicle performs a function of managing or controlling resources of a set of vehicle-mounted devices in the platoon, and needs to update, in real time, surrounding traffic status data reported by a vehicle-mounted device of a vehicle that has joined the platoon, and report the surrounding traffic status data to an RSU. In addition, the vehicle-mounted device of the header vehicle receives messages from the RSU in real time and shares the messages with the vehicle-mounted device of the vehicle that has joined the platoon. These messages include a road condition and traffic information of a relatively distant location (for example, a location that cannot be directly perceived by the vehicle-mounted device). Vehicle-mounted devices of vehicles that have joined the platoon may further share information with each other in the platoon in a vehicle to vehicle (V2V) communication manner. Platoon communication may include the following several communication manners: (1) communication between the vehicle-mounted device of the header vehicle and a vehicle-mounted device of a vehicle that has joined the platoon; (2) communication between vehicle-mounted devices of vehicles that have joined the platoon; (3) communication between a vehicle-mounted device of a vehicle that has joined the platoon and a vehicle-mounted device of a vehicle that has not joined the platoon; and (4) communication between the vehicle-mounted device of the header vehicle and the RSU.

In addition, platoon communication may further include several communication manners: unicast communication, multicast communication, and broadcast communication. Unicast is a communication manner in which a sender sends a message to one specific receiver. Multicast is a communication manner in which a sender sends a message to a plurality of specific receivers at a same time. Broadcast is a communication manner in which a sender sends a message to a plurality of non-specific receivers at a same time, and all receivers within a signal coverage area of the sender can receive the message.

Figure 1:
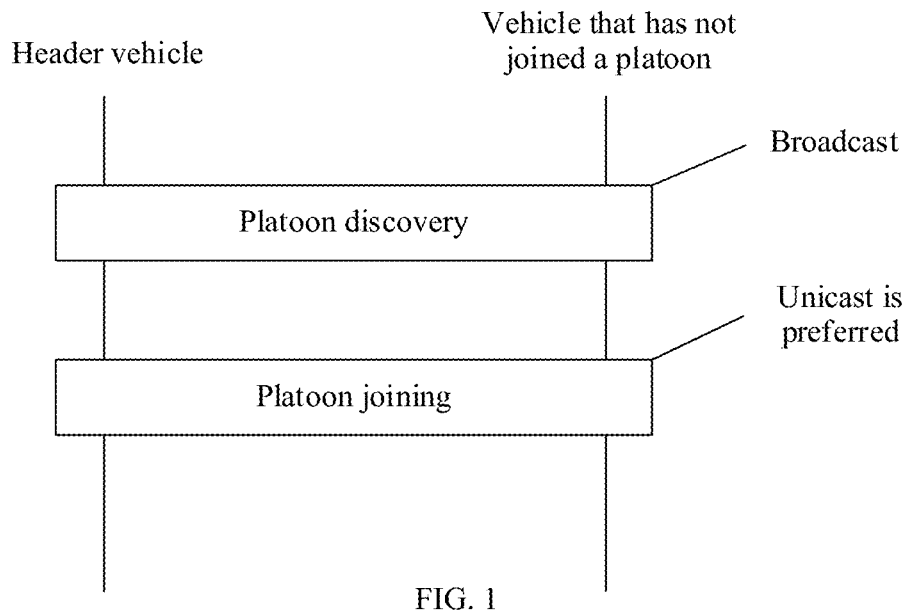
FIG. 1 is a schematic diagram of a system framework for resource allocation in platoon communication according to an embodiment of the application.

To participate in platoon communication, a vehicle that has not joined the platoon needs to join the platoon. Correspondingly, a vehicle-mounted device needs to join a group. The vehicle-mounted device of the header vehicle that forms and manages the platoon and the vehicle-mounted device of the vehicle that has not joined the platoon perform a communication procedure for joining the platoon. FIG. 1 is a schematic diagram of an example of several key procedures during platoon forming. In an embodiment of the invention, to avoid confusion, it should be noted that a set of vehicle-mounted devices is represented by a platoon or a group. Platoon communication refers to communication between vehicle-mounted devices in a vehicle platoon. Actually, communication between vehicle platoons is communication between vehicle-mounted devices of vehicles. Therefore, the so-called platoon communication herein is actually group communication (for a meaning of the group, refer to content of the group described in the background), and for ease of description, is referred to as group communication in the following descriptions. Correspondingly, various messages exchanged between vehicle-mounted devices are also referred to as names with the word "group".

First, a group is discovered. A vehicle-mounted device of a header vehicle or a vehicle-mounted device of a vehicle that has not joined a platoon may broadcast a discovery message (e.g., platoon discovery) to discover the other party. After finding the platoon, the vehicle-mounted device of the vehicle that has not joined the platoon may send a "group joining request" (e.g., platoon join request) to the vehicle-mounted device of the header vehicle. After receiving a "group joining response" (e.g., platoon join response) returned by the vehicle-mounted device of the header vehicle, the vehicle-mounted device of the vehicle that has not joined the platoon may participate in group communication.

When a vehicle-mounted device of a vehicle performs platoon communication by using a resource, the following factors need to be considered:

(1) Groups formed by vehicle-mounted devices in different vehicle platoons may share a resource pool. In this case, communication interference between the groups needs to be avoided. This factor is described in detail in operation 202 in an embodiment of the application as follows. Details are not described herein.

(2) A conflict between a resource of the group joining message and another resource should be avoided as much as possible. Group joining has time validity, and a period of the group joining message may be longer than a service period of communication between vehicle-mounted devices in the group. In addition, group joining occurs between the vehicle-mounted device of the header vehicle and the vehicle-mounted device of the vehicle that has not joined the platoon. Therefore, unicast communication or multicast communication is preferred.

In consideration of the foregoing two factors, a message related to group joining can be relatively highly reliable and is not prone to a delay or a loss, so that a vehicle that has not joined the platoon can join the platoon as soon as possible.

Therefore, to avoid a resource using conflict during communication between the vehicle-mounted device of the vehicle that has not joined the platoon and the vehicle-mounted device of the vehicle in the platoon, it may be considered that an independent resource is allocated to the group joining message. An embodiment of the invention provides the following solution to this technical problem.

Based on the foregoing system framework, the following describes embodiments of the application in detail. It should be noted that, in the following embodiments, a "first device" may be a vehicle-mounted device of a manager (e.g., a header vehicle) in a vehicle platoon, is a wireless vehicle-mounted communications device, and is responsible for forming a group. Alternatively, the "first device" may be a wireless communications device of an unmanned aerial vehicle or another type of wireless communications device that participates in group communication. In at least some embodiments of the application, the first device is the vehicle-mounted device of the header vehicle, and the first device is referred to as the vehicle-mounted device of the header vehicle below. A "second device" may be a device outside the group, that is, a vehicle-mounted device that has not joined the group. A "third device" may be a device in the group, that is, a vehicle-mounted device that has joined the group.

Figure 2:
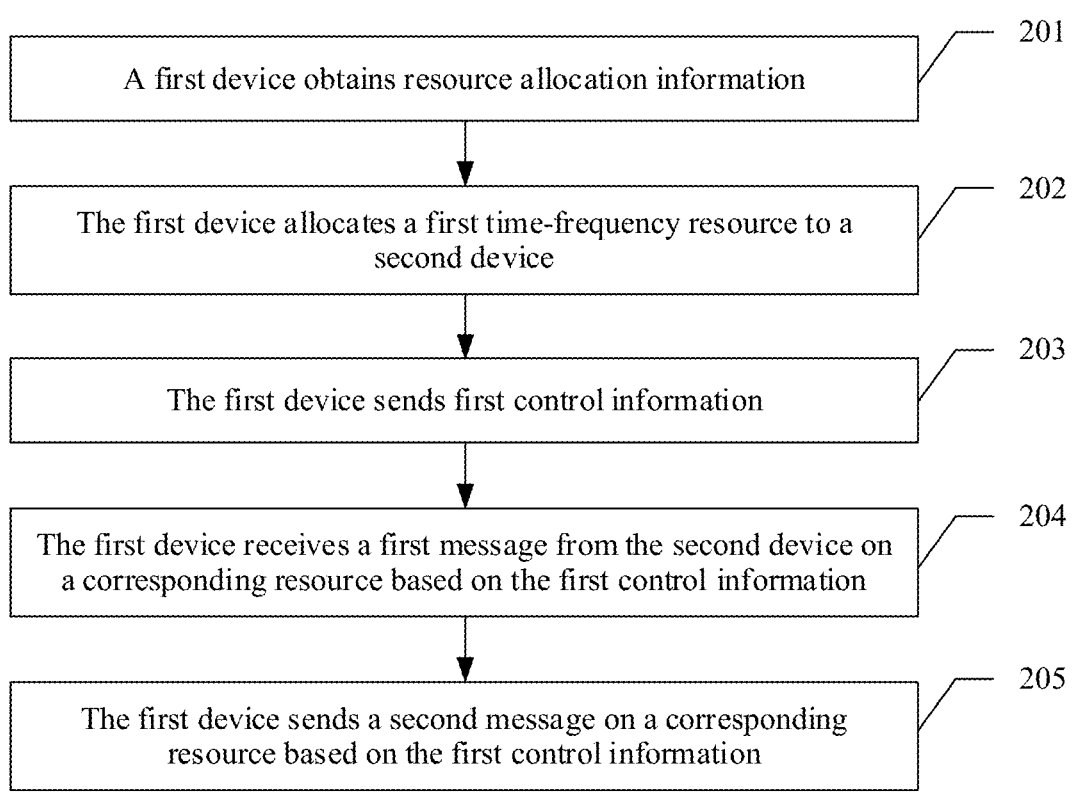
FIG. 2 is a schematic diagram of an embodiment of a resource allocation method for group communication according to an embodiment of the application.

Referring to FIG. 2, an embodiment of a resource allocation method for group communication includes:

201. A first device obtains resource allocation information.

When forming a group, the first device needs to communicate with a second device on a specified time-frequency resource, to ensure that the second device smoothly joins the group. The group further includes a third device. The third device may communicate with the first device on a specific resource, or may communicate with another third device on a specific resource. The first device obtains the resource allocation information in two manners. In one manner, when the first device is within a network coverage area, a network device may allocate a resource to the group formed by the first device. In the other manner, the first device autonomously selects a time-frequency resource from a preconfigured time-frequency resource pool.

202. The first device allocates a first time-frequency resource to the second device.

In an embodiment, after obtaining the resource allocation information, the first device may allocate the first time-frequency resource to the second device. In addition, the first device may further allocate a second time-frequency resource to the third device. The first time-frequency resource is dedicated resource configuration information used by the first device to send a "joining request" message and a "joining response" message. Both the first time-frequency resource and the second time-frequency resource may be some of resources in the resource allocation information obtained by the first device.

203. The first device sends first control information.

In an embodiment, the first control information sent by the first device may include only first configuration information that is used to indicate the first time-frequency resource, or may include both the first configuration information and second configuration information that is used to indicate the second time-frequency resource, or may include both the first configuration information and configuration information that is used to indicate a time-frequency resource, where the time-frequency resource is a time-frequency resource allocated by the first device for group communication. The first control information may be sent in two manners: by using a MIB-SL or SCI.

204. The first device receives a first message from the second device on a corresponding resource based on the first control information.

After sending the first control information, the first device may receive, based on the first control information and on a time-frequency resource (e.g., a third time-frequency resource) corresponding to the first control information, the first message sent by the second device.

205. The first device sends a second message on a corresponding resource based on the first control information.

The first device sends the second message to the second device based on the first control information and on a time-frequency resource (e.g., a fourth time-frequency resource) corresponding to the first control information.

In an embodiment, after allocating the first time-frequency resource to the second device, the first device may send the first control information that includes the first configuration information that is used to indicate the first time-frequency resource, and then the first device receives, based on the first control information and on the corresponding time-frequency resource, the first message sent by the second device, and sends the second message to the second device based on the first control information and on the corresponding time-frequency resource. Because the first device and the second device transmit information by using the dedicated first time-frequency resource, this avoids a resource conflict with information transmission between the first device and the third device and information transmission between third devices when the first device and the second device transmit information by using the first time-frequency resource, to ensure that the second device can smoothly join the group.

Figure 3:
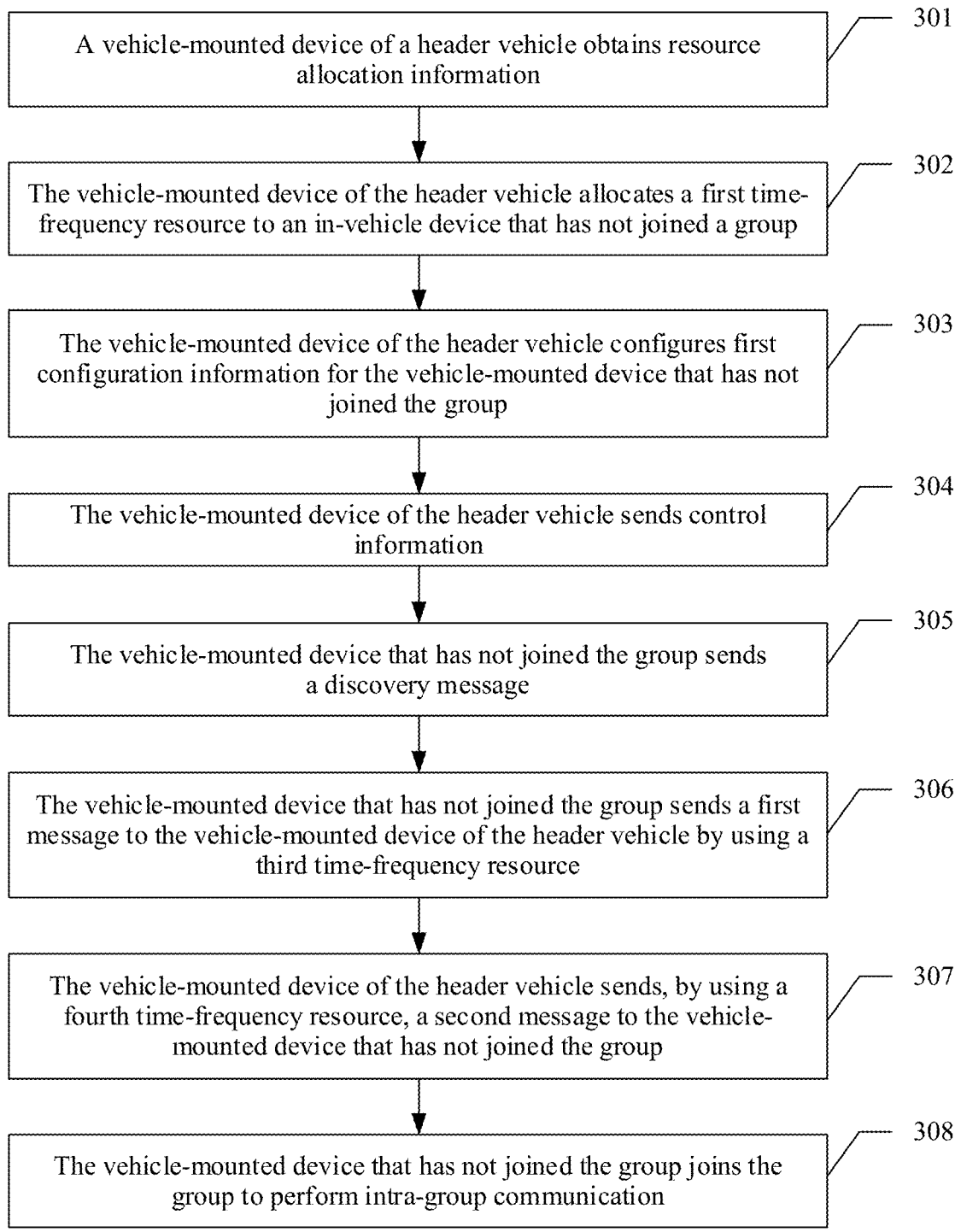
FIG. 3 is a schematic diagram of another embodiment of a resource allocation method for group communication according to an embodiment of the application.

Referring to FIG. 3, another embodiment of a resource allocation method for group communication includes:

301. A vehicle-mounted device of a header vehicle obtains resource allocation information.

In a process in which the vehicle-mounted device of the header vehicle (e.g., a first device, collectively referred to as the vehicle-mounted device of the header vehicle below) forms a vehicle-mounted device of another vehicle into a group, the vehicle-mounted device of the header vehicle needs to communicate, on a specified time-frequency resource, with a vehicle-mounted device that has not joined the group (e.g., a second device, collectively referred to as a vehicle-mounted device that has not joined the group below), to determine whether the vehicle-mounted device that has not joined the group can join the group. After joining the group, the vehicle-mounted device of the vehicle becomes a group member, that is, a vehicle-mounted device that has joined the group (e.g., a third device, collectively referred to as a vehicle-mounted device that has joined the group below). The vehicle-mounted device that has joined the group may communicate with the vehicle-mounted device of the header vehicle on a specific resource, or may communicate with a vehicle-mounted device that is of another vehicle and that is in the group on a specific resource. Such communication is referred to as intra-group communication. In an embodiment of the invention, communication between the vehicle-mounted device that has not joined the group and the vehicle-mounted device of the header vehicle during group forming and intra-group communication after group forming are collectively referred to as group communication.

A resource required for communication of a vehicle-mounted device in a group forming process and a resource required for communication of a vehicle-mounted device in a platoon after group forming are allocated in two manners.

In a first manner, when the vehicle-mounted device of the header vehicle is within a network coverage area, a network device (for example, a base station or a roadside unit) may allocate a resource to a vehicle-mounted device group of a vehicle platoon to be formed by the vehicle-mounted device of the header vehicle, and the vehicle-mounted device of the header vehicle obtains the resource allocation information from the network device. The resource allocation information includes time domain resource information and frequency domain resource information. The network device may explicitly indicate at least one of the time domain resource information and the frequency domain resource information by using signaling.

In a second manner, the vehicle-mounted device of the header vehicle autonomously selects a time-frequency resource from a preconfigured time-frequency resource pool. In this case, the vehicle-mounted device of the header vehicle obtains allocation information of the time-frequency resource from a processing unit of the vehicle-mounted device.

Wireless management organizations in different countries or regions may allocate dedicated spectrum resources for V2X communication. A standard protocol may specify a spectrum resource range in advance or a corresponding range of preconfigured spectrum resources is obtained from a network device in a network connection process of a vehicle-mounted device. These preconfigured spectrum resources include a time resource and a frequency resource, collectively referred to as a resource pool. A vehicle-mounted communications device participating in V2X communication may autonomously select a proper time-frequency resource (including a time resource and a frequency resource) from the resource pool to send a message, or use a corresponding time-frequency resource according to an instruction of another device with a resource allocation function to send a message.

Figure 4:
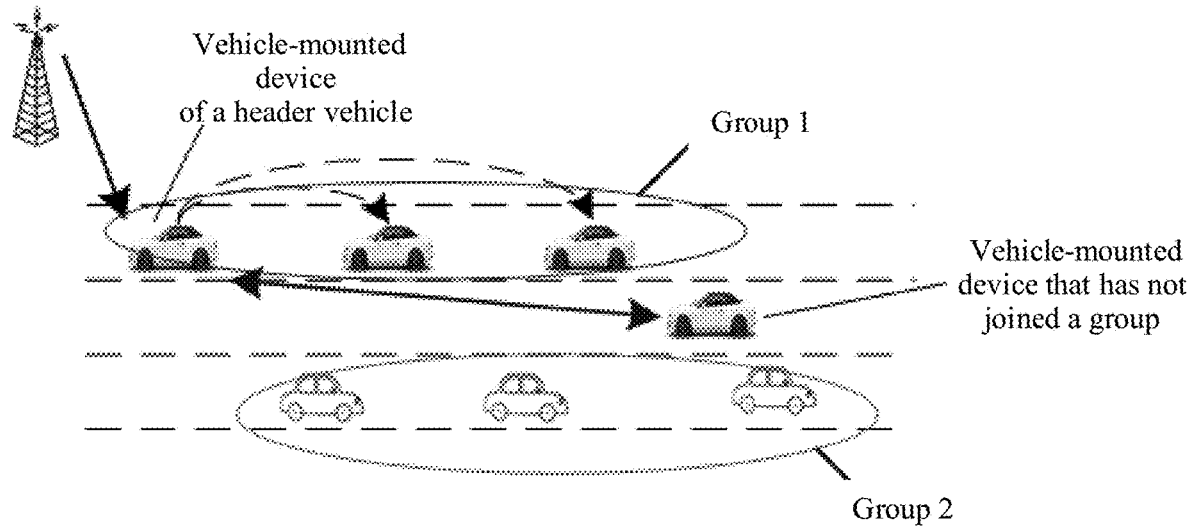
FIG. 4 is a schematic diagram of communication in which different groups share a resource pool according to an embodiment of the application.

The vehicle-mounted device of the header vehicle in the vehicle platoon may select a proper resource for communication during group forming and communication after group forming in at least one of the following manners, and reserve a time-frequency resource in a period of time for group communication: listening to a status of a resource that is in a resource pool and that is occupied by another vehicle-mounted device to send a message, a contention-based manner (e.g., the vehicle-mounted device of the header vehicle selects a resource with less interference from the resource pool in a listening manner, and may send resource reservation information, and another vehicle-mounted device may determine, based on a grouping priority and a corresponding criterion, whether the resource can be multiplexed), and reporting, by another vehicle-mounted device, a resource using status. These time-frequency resources are referred to as reserved resources. Due to mobility of vehicles, vehicle-mounted devices in groups (for example, a group 1 and a group 2) at different geographical locations may share a resource in a resource pool (FIG. 4 is a schematic diagram of communication in which groups formed by different vehicle-mounted devices share a resource pool according to an embodiment of the application). In this case, if each group can use a relatively fixed resource, another group can properly select a resource. In this way, when different groups share a resource pool, conflicts and communication interference that are caused by random resource selection of the groups can be reduced. Time-frequency domain information of a resource reserved by the vehicle-mounted device of the header vehicle for group communication of the vehicle-mounted device of the header vehicle is referred to as the resource allocation information.

302. The vehicle-mounted device of the header vehicle allocates a first time-frequency resource to the vehicle-mounted device that has not joined the group.

In an embodiment, the first time-frequency resource is a time-frequency resource that is selected by the vehicle-mounted device of the header vehicle from the resource pool and that is reserved for communication between the vehicle-mounted device of the header vehicle and the vehicle-mounted device that has not joined the group. The first time-frequency resource is a set of a first time domain resource and a first frequency domain resource, and is some of resources in the resource allocation information obtained by the vehicle-mounted device of the header vehicle in operation 301. The first time-frequency resource is independent of a second time-frequency resource (which is described in detail in the following content) allocated by the vehicle-mounted device of the header vehicle to the vehicle-mounted device that has joined the group.

The first time-frequency resource is used for communication between the vehicle-mounted device of the header vehicle and the vehicle-mounted device that has not joined the group.

Before joining the group, the vehicle-mounted device that has not joined the group needs to exchange information with a group management device (e.g., the vehicle-mounted device of the header vehicle). The vehicle-mounted device that has not joined the group sends a first message (e.g., a "joining request" message, where the first message is collectively referred to as a "joining request" message below) to the vehicle-mounted device of the header vehicle, and the vehicle-mounted device of the header vehicle sends a second message (e.g., a "joining response" message is sent, where the "joining response" message is collectively referred to as a "joining response" message below) to the vehicle-mounted device that has not joined the group, to exchange information. The first time-frequency resource is a time-frequency resource that is used by the vehicle-mounted device that has not joined the group to send the "joining request" message to the vehicle-mounted device of the header vehicle and that is used by the vehicle-mounted device of the header vehicle to send the "joining response" message to the vehicle-mounted device that has not joined the group. The first time-frequency resource includes a third time-frequency resource and a fourth time-frequency resource. The third time-frequency resource is a time-frequency resource used when the vehicle-mounted device that has not joined the group sends the "joining request" message to the vehicle-mounted device of the header vehicle. The fourth time-frequency resource is a time-frequency resource used when the vehicle-mounted device of the header vehicle sends the "joining response" message to the vehicle-mounted device that has not joined the group.

The vehicle-mounted device of the header vehicle may further allocate the second time-frequency resource to the vehicle-mounted device that has joined the group. The second time-frequency resource is a set of a second time domain resource and a second frequency domain resource, is some of resources in the resource allocation information obtained by the vehicle-mounted device of the header vehicle in operation 301, and is used for communication between the vehicle-mounted device of the header vehicle and one vehicle-mounted device that has joined the group or a plurality of vehicle-mounted devices that have joined the group. The second time-frequency resource is independent of the first time-frequency resource. In other words, the second time-frequency resource is different from the first time-frequency resource allocated by the vehicle-mounted device of the header vehicle to the vehicle-mounted device that has joined the group.

It should be noted that the first time-frequency resource may be a part of the time-frequency resource, or may be a resource other than the time-frequency resource. In other words, in this case, the vehicle-mounted device of the header vehicle may separately reserve resources for the vehicle-mounted device that has joined the group and the vehicle-mounted device that has not joined the group. When the vehicle-mounted device of the header vehicle reserves a resource only for the vehicle-mounted device that has joined the group (e.g., the time-frequency resource includes only the second time-frequency resource), the first time-frequency resource is a resource other than the time-frequency resource. Similarly, the second time-frequency resource may be a part of the time-frequency resource, or may be a resource other than the time-frequency resource. This is not limited herein.

In addition, the vehicle-mounted device of the header vehicle may first allocate a time-frequency resource for group communication and to the vehicle-mounted device that has not joined the group. In other words, the time-frequency resource may include the first time-frequency resource reserved for the vehicle-mounted device that has not joined the group and the second time-frequency resource reserved for the vehicle-mounted device that has joined the group. Then, the header vehicle allocates, from the time-frequency resource, the first time-frequency resource to the vehicle-mounted device that has not joined the group. Alternatively, the vehicle-mounted device of the header vehicle may first allocate a time-frequency resource only to a vehicle that has not joined the group. In other words, the time-frequency resource is the first time-frequency resource.

The following describes in detail that after obtaining the resource allocation information, the vehicle-mounted device of the header vehicle allocates the second time-frequency resource to the vehicle-mounted device that has joined the group, and allocates the first time-frequency resource to the vehicle-mounted device that has not joined the group.

1. The vehicle-mounted device of the header vehicle allocates the second time-frequency resource to the vehicle-mounted device that has joined the group.

The vehicle-mounted device of the header vehicle needs to allocate a time-frequency resource for communication in a platoon of the header vehicle, because after the platoon is formed, vehicle-mounted devices that have joined the group and a quantity of the vehicle-mounted devices that have joined the group are basically stable in the group, and a requirement for a communication resource is also relatively stable. Because vehicle-mounted devices in different groups (for example, the group 1 and the group 2) may share a resource in a resource pool (FIG. 4 is a schematic diagram of communication in which different groups share a resource pool according to an embodiment of the application), if a vehicle-mounted device in each group can use a relatively fixed resource, another group can properly select a resource. In this way, when vehicle-mounted devices in different groups share a resource pool, conflicts and communication interference that are caused by random resource selection of the groups can be reduced.

1.1 The vehicle-mounted device of the header vehicle allocates the second time-frequency resource in a semi-static reservation manner.

The vehicle-mounted device of the header vehicle may allocate, in the semi-static resource reservation manner, the second time-frequency resource to the vehicle-mounted device that has joined the group.

In an embodiment, in the semi-static resource reservation manner, the vehicle-mounted device of the header vehicle periodically reserves, based on a time period, the second time-frequency resource for the vehicle-mounted device that has joined the group. A manner is as follows: all resources are divided in advance in time based on a period, where each period includes a set of several basic time units, and then the vehicle-mounted device of the header vehicle in each group allocates, in one or more periods, one or more basic time units at a specific location in each time period to a vehicle-mounted device that has joined the group and that is in the group. Specific locations selected by vehicle-mounted devices of header vehicles in the groups may be different. This manner of reserving specific time resources in a plurality of time periods is referred to as semi-static resource reservation. The basic time unit may be a subframe of 1 ms in an LTE system, or may be a basic scheduling unit (where the basic scheduling unit may be understood as a basic time unit) defined in a new radio (NR) system. In the semi-static resource reservation allocation manner, a resource at a same time location may be allocated, for example, in a first period and a second period, but a resource at a different time location may be allocated in a third period. This is not limited herein.

Figure 5:
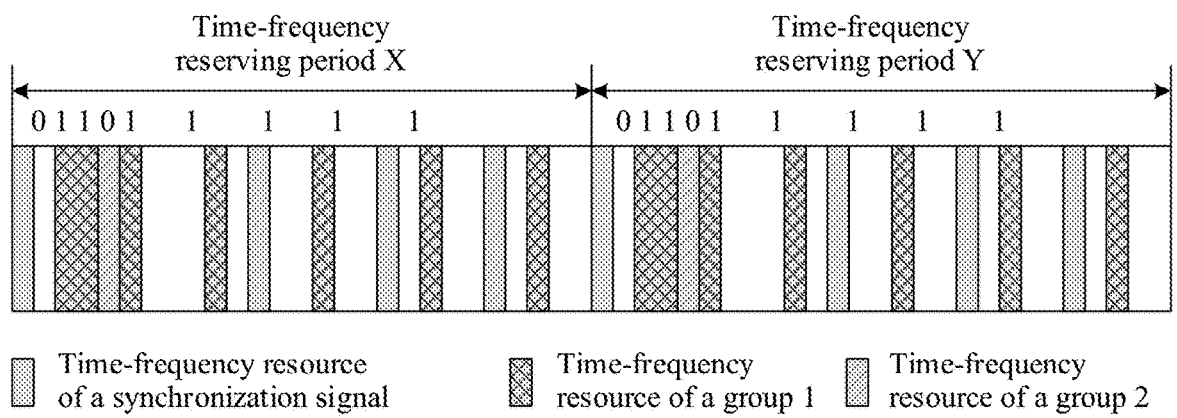
FIG. 5 is a schematic diagram in which vehicle-mounted devices of header vehicles allocate time-frequency resources to respective groups according to an embodiment of the application.

As shown in FIG. 4, two groups, namely, the group 1 and the group 2 are listed, and vehicle-mounted devices of respective header vehicles reserve respective time-frequency resources in a resource pool. FIG. 5 shows an example in which a vehicle-mounted device of a header vehicle may indicate, based on a time period, a time-frequency resource to a vehicle-mounted device that has joined a group according to an embodiment of the application. In FIG. 5, because the time-frequency resource is a subset of a time domain resource and a frequency domain resource, the time-frequency resource is a time-frequency resource including a time domain resource and a frequency domain resource. The time-frequency resource is divided into a plurality of periods (e.g., reservation periods) in advance, and a vehicle-mounted device of each header vehicle reserves, in each period, a resource for a group formed by the vehicle-mounted device of the header vehicle. In FIG. 5, different legends are used to separately represent time-frequency resources reserved by the vehicle-mounted devices of the header vehicles in the group 1 and the group 2. A bit value above a legend in the figure represents a resource reservation status of the group 1. If a value is 0, it indicates that a time-frequency resource in a time unit is not reserved for the group 1, or if a value is 1, it indicates that a time-frequency resource in a time unit is reserved for the group 1 (some time units that are not reserved by the vehicle-mounted device of the header vehicle in the group 1 are not represented by values).

2. The vehicle-mounted device of the header vehicle allocates the first time-frequency resource to the vehicle-mounted device that has not joined the group.

The vehicle-mounted device of the header vehicle allocates an independent dedicated time-frequency resource to a joining message (e.g., the "joining request" message and the "joining response" message) of the vehicle-mounted device that has not joined the group, because this can avoid a resource conflict with the vehicle-mounted device that has joined the group.

The vehicle-mounted device of the header vehicle may allocate the time-frequency resource to the vehicle-mounted device that has not joined the group in the following three manners. In a first manner, the vehicle-mounted device of the header vehicle allocates the first time-frequency resource in the semi-static reservation manner. In a second manner, the vehicle-mounted device of the header vehicle allocates the first time-frequency resource in a dynamic reservation manner. In a third manner, the vehicle-mounted device of the header vehicle allocates the first time-frequency resource in a preset fixed allocation manner. In an embodiment, the first method is used, that is, the vehicle-mounted device of the header vehicle allocates, in the semi-static reservation manner, the first time-frequency resource to the vehicle-mounted device that has not joined the group.

The vehicle-mounted device of the header vehicle may periodically allocate, based on time periods obtained through division in advance, the first time-frequency resource to the vehicle-mounted device that has not joined the group. An allocation manner is similar to the manner in which the vehicle-mounted device of the header vehicle allocates the second time-frequency resource to the vehicle-mounted device that has joined the group in 1.1. The resource reserved by the vehicle-mounted device of the header vehicle for the vehicle-mounted device that has not joined the group does not overlap the resource reserved by the vehicle-mounted device of the header vehicle for the vehicle-mounted device that has joined the group. Therefore, when the vehicle-mounted device that has not joined the group and the vehicle-mounted device that has joined the group communicate by using the resources, there is no resource using conflict.

Figure 6:
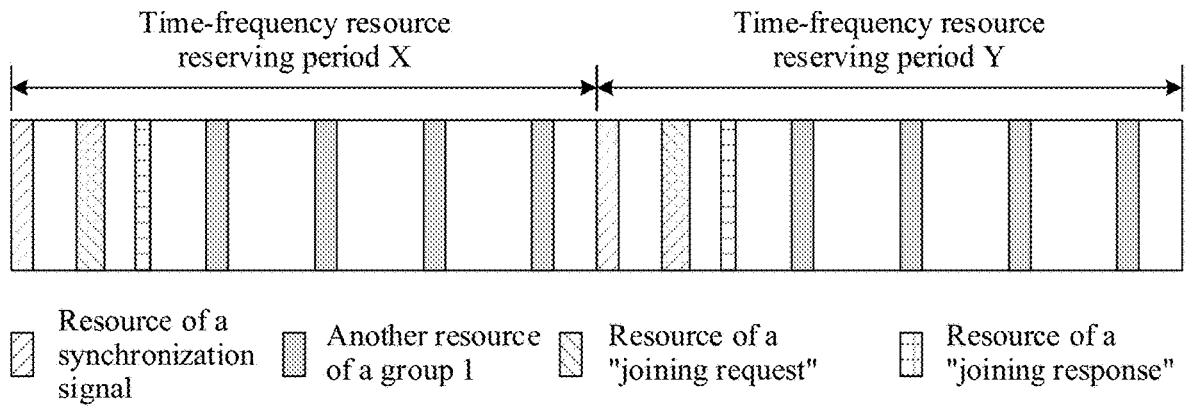
FIG. 6 is a schematic diagram in which a vehicle-mounted device of a header vehicle allocates a time-frequency resource to a joining message according to an embodiment of the application.

For example, FIG. 6 is a schematic diagram of allocating resources to a "joining request" message and a "joining response" message according to an embodiment of the application. The vehicle-mounted device of the header vehicle may allocate different subframes to the "joining request" message and the "joining response" message in a time period in a time division multiplexing manner. In addition, a resource allocated to a joining message of the vehicle-mounted device that has not joined the group does not overlap a time domain resource allocated to the vehicle-mounted device that has joined the group, thereby avoiding a resource using conflict.

In addition, because the vehicle-mounted device of the header vehicle does not always receive the joining request message sent by the vehicle-mounted device that has not joined the group, the vehicle-mounted device of the header vehicle may disallow a new vehicle-mounted device that has not joined the group to join the platoon after the platoon is formed. In this case, the vehicle-mounted device of the header vehicle does not need to allocate resources to the "joining request" message and the "joining response" message.

It should be noted that a method used by the vehicle-mounted device of the header vehicle to allocate the first time-frequency resource to the vehicle-mounted device that has not joined the group and a method used by the vehicle-mounted device of the header vehicle to allocate the second time-frequency resource to the vehicle-mounted device that has joined the group are not limited herein.

It should be noted that a sequence between allocating, by the vehicle-mounted device of the header vehicle, the second time-frequency resource to the vehicle-mounted device that has joined the group and allocating, by the vehicle-mounted device of the header vehicle, the first time-frequency resource to the vehicle-mounted device that has not joined the group is not limited. In addition, allocating, by the vehicle-mounted device of the header vehicle, the first time-frequency resource to the vehicle-mounted device that has not joined the group is not under a precondition that the vehicle-mounted device of the header vehicle allocates the second time-frequency resource to the vehicle-mounted device that has joined the group.

303. The vehicle-mounted device of the header vehicle configures first configuration information for the vehicle-mounted device that has not joined the group.

After the vehicle-mounted device of the header vehicle allocates the first time-frequency resource (e.g., the set of the first time domain resource and the second frequency domain resource) to the vehicle-mounted device that has not joined the group, the vehicle-mounted device of the header vehicle needs to configure the first configuration information for communication of the vehicle-mounted device that has not joined the group. In an embodiment, configuration information of the first time-frequency resource is referred to as the first configuration information, and the first configuration information is information that is used to indicate the first time-frequency resource. In addition, the vehicle-mounted device of the header vehicle also configures second configuration information for communication of the vehicle-mounted device that has joined the group. The second configuration information is information that is used to indicate the second time-frequency resource.

The vehicle-mounted device of the header vehicle may configure the first configuration information for the vehicle-mounted device that has not joined the group by indicating time domain resource information of the first time-frequency resource. In this case, all frequency domain resource information in the indicated time domain resource information of the first time-frequency resource may be used to configure the first configuration information.

Further, there are three implementations in which the vehicle-mounted device of the header vehicle configures the first configuration information for the vehicle-mounted device that has not joined the group by indicating the time domain resource information of the first time-frequency resource. In a first implementation, the vehicle-mounted device of the header vehicle configures the first configuration information for the vehicle-mounted device that has not joined the group by indicating the time domain resource information of the first time-frequency resource by using a time resource pattern (TRP, which may also be referred to as a bitmap). Further, the vehicle-mounted device of the header vehicle may configure the first configuration information for the vehicle-mounted device that has not joined the group by indicating frequency domain resource information of the first time-frequency resource while indicating the time domain resource information of the first time-frequency resource. In a second manner, the vehicle-mounted device of the header vehicle configures the first configuration information for the vehicle-mounted device that has not joined the group by first indicating time domain resource information of the time-frequency resource by using the TRP, and then indicating the time domain resource information of the first time-frequency resource by using a time offset parameter, where the time-frequency resource includes the first time-frequency resource and the second time-frequency resource. In a third implementation, the vehicle-mounted device of the header vehicle indicates, by using the TRP, time domain information of the time-frequency resource including the first time-frequency resource and the second time-frequency resource, and some basic time units in the time-frequency resource are considered as the first configuration information by default and are used to indicate the first time-frequency resource. In this allocation manner, only configuration information used to indicate a time domain resource of the time-frequency resource is included, and configuration information used to explicitly indicate a time domain resource of the first time-frequency resource and configuration information used to explicitly indicate a time domain resource of the second time-frequency resource are not included. In an embodiment, the first method is used. To be specific, the vehicle-mounted device of the header vehicle configures the first configuration information for the vehicle-mounted device that has not joined the group by indicating the time domain resource information of the first time-frequency resource by using the time resource pattern TRP. The following describes this method in detail.

The TRP indicates time domain resource information of an available time-frequency resource by using a bitmap including a plurality of bits. In an embodiment, the vehicle-mounted device of the header vehicle has reserved a time-frequency resource. It is assumed that there are N basic time units in each period, where Q basic time units may be used for group communication (e.g., communication between the vehicle-mounted device of the header vehicle and the vehicle-mounted device that has not joined the group, communication between the vehicle-mounted device of the header vehicle and the vehicle-mounted device that has joined the group, communication between vehicle-mounted devices that have joined the group, and the like) managed by the vehicle-mounted device of the header vehicle. The TRP indicates the time domain resource information of the first time-frequency resource by indicating a used basic time unit location by using a bitmap. Each bit represents one possible basic time unit location. When a bit value is 1 (or 0), it indicates that a resource in a basic time unit corresponding to the bit is used. If an available range of the time-frequency resource is N basic time units, N bits may be used to represent the time domain resource information of the first time-frequency resource. Because each bit corresponds to one basic time unit, the vehicle-mounted device of the header vehicle may indicate information about all reserved resources by using N bits. Herein, it may be preset that a bit value is valid when being 1 and is invalid when being 0; or it may be set that a bit value is invalid when being 1 and is valid when being 0. When the bit value is valid, it indicates that a corresponding basic time unit may be used for group communication of the vehicle-mounted device of the header vehicle.

Further, in an embodiment, for example, L bits are used to represent L basic time units starting from a fixed time domain location in the Q basic time units (e.g., used for group communication), and some or all of the L basic time units (for example, subframes) are allocated as the first time-frequency resource. In this case, the vehicle-mounted device of the header vehicle configures, in the following manner, the first configuration information for the vehicle-mounted device that has not joined the group: a bit location that is in the TRP and that corresponds to a basic time unit that is allocated as the first time-frequency resource from the L basic time units may be set to 1, and a bit location that is in the TRP and that corresponds to a basic time unit (for example, a subframe) that is not allocated as the first time-frequency resource is set to 0. Alternatively, bit locations that are in the TRP and that correspond to the L basic time units may be set to 0, and the bit location that is in the TRP and that corresponds to the basic time unit that is not allocated as the first time-frequency resource may be set to 1.

The foregoing describes how the vehicle-mounted device of the header vehicle configures the first configuration information for the vehicle-mounted device that has not joined the group by indicating the time domain resource information of the first time-frequency resource by using the TRP.

An advantage of indicating the time domain resource information of the first time-frequency resource by using the TRP is that a quantity of bits of resource configuration information (e.g., control information) can be reduced. A counterexample is used. It is assumed that several bits are used to indicate an absolute time domain location for indication. For example, if a location range of a time domain resource of the time-frequency resource is 0 to 7, three bits need to be used for each location. The first time-frequency resource occupies four basic time units. In this case, 4×3=12 bits need to be used to represent locations of the four basic time units. In this counterexample, each basic time unit needs to be indicated by three bits. However, in the TRP indication manner, each basic time unit needs to be indicated by only one bit. Therefore, compared with the method in this counterexample, the quantity of bits of the resource configuration information can be reduced.

Further, in an embodiment, as described above, the vehicle-mounted device of the header vehicle may configure the first configuration information for the vehicle-mounted device that has not joined the group by indicating the frequency domain resource information of the first time-frequency resource while indicating the time domain resource information of the first time-frequency resource. The vehicle-mounted device of the header vehicle may configure the first configuration information for the vehicle-mounted device that has not joined the group by indicating both the time domain resource information of the first time-frequency resource and the frequency domain resource information of the first time-frequency resource. In this case, indication information of a frequency domain resource may be added while the time domain resource information of the first time-frequency resource is indicated. For example, several bits are used to indicate a start frequency domain location (StartRB) and an end frequency domain resource location (EndRB) of resources in the Q basic time units.

It should be noted that a method used by the vehicle-mounted device of the header vehicle to configure the first configuration information for the vehicle-mounted device that has not joined the group by indicating the time domain resource information of the first time-frequency resource is not limited herein.

304. The vehicle-mounted device of the header vehicle sends the control information.

The control information sent by the vehicle-mounted device of the header vehicle may include only the first configuration information, or may include both the first configuration information and the second configuration information (e.g., information configured for the second time-frequency resource), or may include both the configuration information of the time-frequency resource and the first configuration information. The first configuration information is information about the first time-frequency resource allocated by the vehicle-mounted device of the header vehicle to the vehicle-mounted device that has not joined the group, that is, dedicated resource configuration information used by the vehicle-mounted device of the header vehicle to broadcast a "joining request" and a "joining response", to reduce conflicts with a resource used by another signal or another message. Time-frequency resource configuration information of the reserved resource is information about the reserved resource allocated by the vehicle-mounted device of the header vehicle for group communication.

It should be noted that the control information may be sent in two manners. In a first manner, the control information is sent by using a MIB-SL. In a second manner, the control information is sent by using SCI.

If the control information includes only the first configuration information, the vehicle-mounted device of the header vehicle usually sends the control information in a broadcast manner. The vehicle-mounted device of the header vehicle may broadcast, by using the MIB-SL and on a sidelink broadcast channel (e.g., physical sidelink broadcast channel, PSBCH), the control information included on the MIB-SL. Alternatively, the vehicle-mounted device of the header vehicle may broadcast, by using the SCI and on a physical sidelink control channel (PSCCH), the control information included in the SCI. A manner used by the vehicle-mounted device of the header vehicle to send the control information is not limited herein.

If vehicle-mounted devices of header vehicles of various platoons transmit MIB-SLs and sidelink synchronization signals (SLSSs) in a same basic time unit, for example, a same subframe, the vehicle-mounted devices of the header vehicles may send the respective MIB-SLs (where the MIB-SLs carry the control information) on different time-frequency resources in a time division multiplexing manner, that is, PSBCHs carrying the MIB-SLs may be time division multiplexed. If the vehicle-mounted devices of the header vehicles independently transmit the MIB-SLs and the SLSSs in different basic time units, for example, different subframes, the MIB-SLs sent by the vehicle-mounted devices of the different header vehicles may be transmitted on different frequency resources of a same basic time unit in a frequency division multiplexing manner. This is not limited herein.

305. The vehicle-mounted device that has not joined the group sends a discovery message.

When the vehicle-mounted device that has not joined the group needs to join the group, the vehicle-mounted device may send the discovery message (e.g., platoon discovery) to discover the vehicle-mounted device of the header vehicle in the platoon.

306. The vehicle-mounted device that has not joined the group sends a first message to the vehicle-mounted device of the header vehicle by using the third time-frequency resource.

After the vehicle-mounted device that has not joined the group receives the configuration information that is of the first time-frequency resource and that is sent by the vehicle-mounted device of the header vehicle, the vehicle-mounted device that has not joined the group may send the "joining request" message to the vehicle-mounted device of the header vehicle by using the third time-frequency resource in the first time-frequency resource reserved by the vehicle-mounted device of the header vehicle for the vehicle-mounted device that has not joined the group. It should be noted that the vehicle-mounted device that has not joined the group may send the "joining request" message for a plurality of times by using the third time-frequency resource in the first time-frequency resource, or may send the "joining request" message only once. This is not limited herein.

It should be noted that, in an embodiment, operation 305 may alternatively not be performed. Instead, operation 306 is directly performed after operation 304 is performed. In other words, after receiving a control message sent by the vehicle-mounted device of the header vehicle in operation 304, the vehicle-mounted device that has not joined the group directly performs operation 306. This is not limited herein.

307. The vehicle-mounted device of the header vehicle sends, by using the fourth time-frequency resource, a second message to the vehicle-mounted device that has not joined the group.

The second message is the "joining response" message sent by the vehicle-mounted device of the header vehicle to the vehicle-mounted device that has not joined the group. In an embodiment, after the vehicle-mounted device of the header vehicle receives the "joining request" message that is sent, by using the third time-frequency resource in the first time-frequency resource, by the vehicle-mounted device that has not joined the group, the vehicle-mounted device of the header vehicle may send, by using the fourth time-frequency resource in the first time-frequency resource, the "joining response" message to the vehicle-mounted device that has not joined the group. However, the third time-frequency resource that is in the first time-frequency resource and that is occupied by the "joining request" message is different from the fourth time-frequency resource that is in the first time-frequency resource and that is occupied by the "joining response" message.

Figure 7:
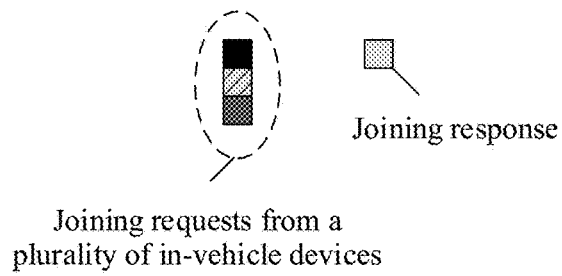
FIG. 7 is a schematic diagram in which a vehicle-mounted device of a header vehicle responds, in a group response manner, to joining request messages of a plurality of vehicle-mounted devices that have not joined a group according to an embodiment of the application.

It should be noted that the vehicle-mounted device of the header vehicle may respond to the joining request message in a group response manner. There are the following three group response manners:

In a first manner, for "joining request" messages of a plurality of vehicle-mounted devices that have not joined the group, the vehicle-mounted device of the header vehicle in the platoon may send one combined response in one message or one signal. FIG. 7 shows that a vehicle-mounted device of a header vehicle responds, in a group response manner, to "joining request" messages of a plurality of vehicle-mounted devices that have not joined a group according to an embodiment of the application. Three blocks with different grayscales in a dashed-line ellipse in FIG. 7 separately represent three different vehicle-mounted devices that have not joined the group.

Figure 8:
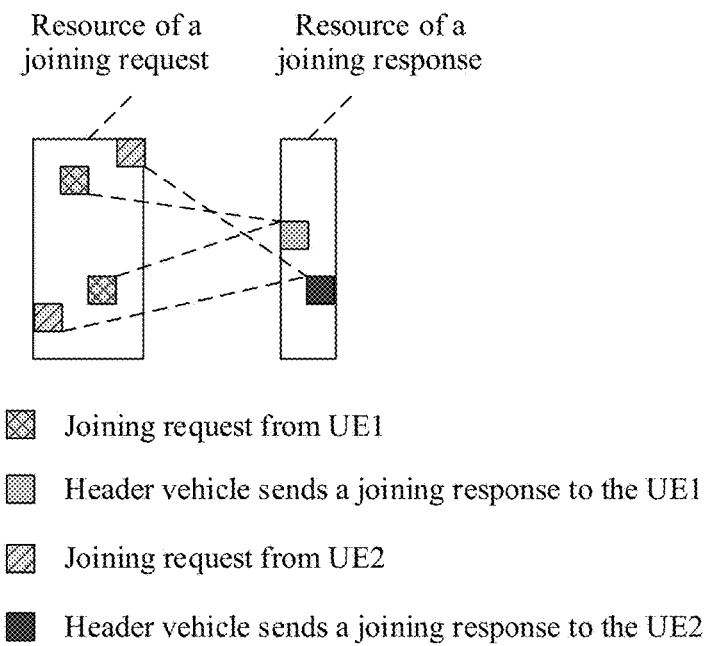
FIG. 8 is a schematic diagram in which vehicle-mounted devices of two different header vehicles separately respond to joining request messages of different vehicle-mounted devices that have not joined a group according to an embodiment of the application.

In a second manner, for each vehicle-mounted device that has not joined the group, the vehicle-mounted device of the header vehicle may allow the vehicle-mounted device that has not joined the group to send a "joining request" message for a plurality of times on a resource of a "joining request", to avoid a possible resource conflict. Instead, the vehicle-mounted device of the header vehicle may reply with a "joining response" message only once. FIG. 8 shows that vehicle-mounted devices of two different header vehicles separately respond to "joining request" messages from different vehicle-mounted devices that have not joined groups according to an embodiment of the application. In this case, the vehicle-mounted device of the header vehicle may configure, for the vehicle-mounted device that has not joined the group, a maximum quantity of times the "joining request" message is sent.

A third manner is a combination of the first manner and the second manner. To be specific, the vehicle-mounted device that has not joined the group may send the "joining request" message to the vehicle-mounted device of the header vehicle for a plurality of times, and the vehicle-mounted device of the header vehicle may reply with one or more group responses to a plurality of "joining request" messages sent by a plurality of vehicle-mounted devices that have not joined the group.

How the vehicle-mounted device of the header vehicle responds to the "joining request" message of the vehicle-mounted device that has not joined the group is not limited herein.

308. The vehicle-mounted device that has not joined the group joins the group to perform intra-group communication.

After the vehicle-mounted device of the header vehicle sends, by using the first time-frequency resource, the "joining response" message to the vehicle-mounted device that has not joined the group, the vehicle-mounted device that has not joined the group may join the group, to participate in intra-group communication with another vehicle-mounted device that has joined the group.

In an embodiment, the vehicle-mounted device of the header vehicle allocates the first time-frequency resource to the vehicle-mounted device that has not joined the group. The first time-frequency resource is different from the second time-frequency resource allocated by the vehicle-mounted device of the header vehicle to the vehicle-mounted device that has joined the group. The vehicle-mounted device of the header vehicle and the vehicle-mounted device that has joined the group are in the same group. Then, the header vehicle configures the first configuration information for the first time-frequency resource, where the first configuration information is used to indicate the first time-frequency resource. Then, the vehicle-mounted device of the header vehicle sends the control information including the first configuration information. After obtaining the control information, the vehicle-mounted device that has not joined the group may send the "joining request" message to the vehicle-mounted device of the header vehicle by using the control information. Finally, the vehicle-mounted device of the header vehicle may send, by using the control information, the "joining response" message to the vehicle-mounted device that has not joined the group. In the foregoing manner of allocating the time-frequency resource to the vehicle-mounted device that has not joined the group, when the "joining request" message is transmitted between the vehicle-mounted device that has not joined the group and the vehicle-mounted device of the header vehicle by using the third time-frequency resource in the first time-frequency resource and the "joining response" message is transmitted between the vehicle-mounted device that has not joined the group and the vehicle-mounted device of the header vehicle by using the fourth time-frequency resource in the first time-frequency resource, a resource using conflict between information transmission between the header vehicle and the vehicle-mounted device that has joined the group and information transmission between vehicle-mounted devices that have joined the group is avoided, so that the vehicle-mounted device that has not joined the group can smoothly join the group.

Further, the "joining request" message is transmitted between the vehicle-mounted device that has not joined the group and the vehicle-mounted device of the header vehicle by using the third time-frequency resource, and the "joining response" message is transmitted between the vehicle-mounted device that has not joined the group and the vehicle-mounted device of the header vehicle by using the fourth time-frequency resource. In other words, a time-frequency resource used to send the "joining request" message is different from a time-frequency resource used to send the "joining response" message. Therefore, this avoids a resource using conflict when the two messages are sent, and further improves a probability that the vehicle-mounted device that has not joined the group smoothly joins the group.

Figure 9:
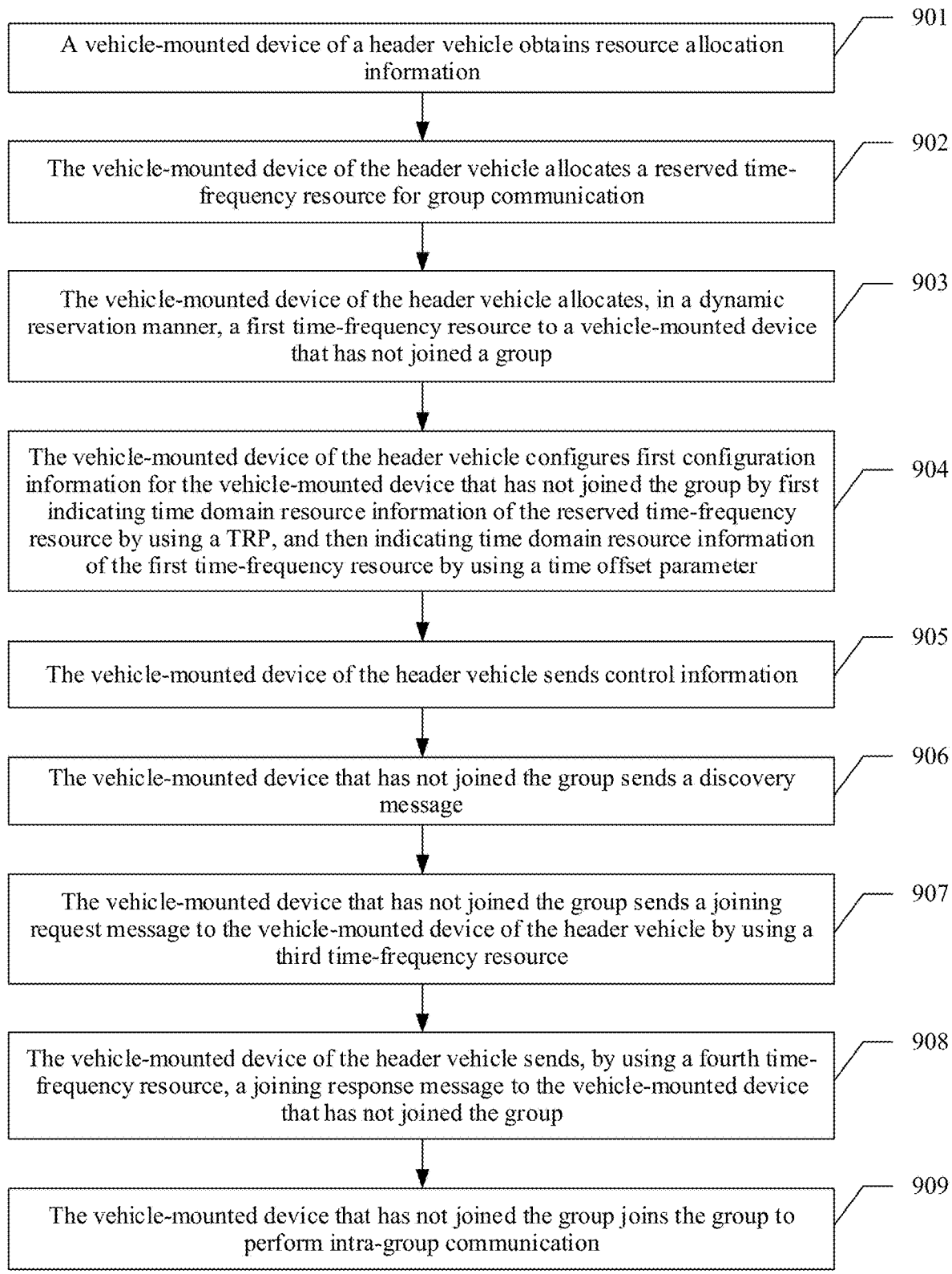
FIG. 9 is a schematic diagram of another embodiment of a resource allocation method for group communication according to an embodiment of the application.

The foregoing describes embodiments of the resource allocation methods, and the following describes another embodiment of a resource allocation method. Referring to FIG. 9, another embodiment of a resource allocation method includes:

901. A vehicle-mounted device of a header vehicle obtains resource allocation information.

Operation 901 in an embodiment is similar to operation 301 in the foregoing embodiment. Details are not described herein.

902. The vehicle-mounted device of the header vehicle allocates a time-frequency resource for group communication.

In an embodiment, after obtaining the resource allocation information, the vehicle-mounted device of the header vehicle may allocate the time-frequency resource for group communication from an obtained resource. The group communication includes one or more of the following: communication between the vehicle-mounted device of the header vehicle and a vehicle-mounted device that has joined a group, communication between vehicle-mounted devices that have joined the group, and communication between the vehicle-mounted device of the header vehicle and a vehicle-mounted device that has not joined the group. In other words, the time-frequency resource allocated by the vehicle-mounted device of the header vehicle for group communication includes a first time-frequency resource and a second time-frequency resource. The first time-frequency resource is used for communication between the header vehicle and the vehicle-mounted device that has not joined the group. The second time-frequency resource is used for communication between the vehicle-mounted device of the header vehicle and the vehicle-mounted device that has joined the group, and communication between the vehicle-mounted devices that have joined the group.

It should be noted that the vehicle-mounted device of the header vehicle may alternatively allocate a time-frequency resource only to the vehicle-mounted device that has not joined the group. In this case, the time-frequency resource includes only the first time-frequency resource. In an embodiment, whether the time-frequency resource allocated by the vehicle-mounted device of the header vehicle includes the first time-frequency resource and the second time-frequency resource or includes only the first time-frequency resource is not limited herein.

903. The vehicle-mounted device of the header vehicle allocates, in a dynamic reservation manner, the first time-frequency resource to the vehicle-mounted device that has not joined the group.

After allocating the time-frequency resource for group communication, the vehicle-mounted device of the header vehicle may allocate, in the dynamic reservation manner, the first time-frequency resource to the vehicle-mounted device that has not joined the group.

The vehicle-mounted device of the header vehicle may periodically allocate, based on time periods obtained through division in advance, the first time-frequency resource to the vehicle-mounted device that has not joined the group, where each time period includes a set of several basic time units, and then the vehicle-mounted device of the header vehicle in each group allocates one or more basic time units at a specific location in each time period to the vehicle-mounted device that has not joined the group. Specific locations selected by the vehicle-mounted device of the header vehicle in time periods are all different. This resource reservation manner in which a plurality of time periods are reserved and specific time resources selected in the time periods are all different is referred to as dynamic resource reservation.

In addition, the header vehicle may disallow a new vehicle-mounted device that has not joined the group to join the group after a platoon is formed. In this case, the vehicle-mounted device of the header vehicle does not need to allocate resources to a "joining request" message and a "joining response" message. For example, an implementation may be as follows: the vehicle-mounted device of the header vehicle may add information to a MIB-SL or SCI to indicate whether the time-frequency resource includes resources of the "joining request" message and the "joining response" message. For example, a bit "1" may be used to indicate "include", and a bit "0" may be used to indicate "not include". Whether the vehicle-mounted device of the header vehicle uses the added information is not limited herein.

904. The vehicle-mounted device of the header vehicle configures first configuration information for the vehicle-mounted device that has not joined the group by first indicating time domain resource information of the time-frequency resource by using a TRP, and then indicating time domain resource information of the first time-frequency resource by using a time offset parameter.

After allocating the first time-frequency resource to the vehicle-mounted device that has not joined the group, the vehicle-mounted device of the header vehicle may first indicate the time domain resource information of the time-frequency resource by using the TRP, and then indicate the time domain resource information of the first time-frequency resource by using an offset relative to the time-frequency resource. The time domain resource information used to indicate the first time-frequency resource is the first configuration information, and the configuration information of the first time-frequency resource may be indicated by using the time offset parameter based on configuration information of the time-frequency resource. When the configuration information (e.g., the first configuration information) of the first time-frequency resource is indicated by using the time offset parameter, the first configuration information needs to be indicated by explicit information.

Specifically, the time offset parameter is an offset (e.g., a time offset of a first basic time unit) of a start time location of the first time-frequency resource relative to a start time location of the time-frequency resource. A corresponding quantity of bits may be used to represent N subframes as long as it is determined that a spacing between the start time location of the first time-frequency resource and the start time location of the time-frequency resource is the N subframes. For example, if the spacing between the start time location of the first time-frequency resource and the start time location of the time-frequency resource is 10 subframes, four bits may be used to indicate a location of any one of the 10 subframes. Therefore, a quantity of information bits can be reduced by defining with a relative offset parameter. The vehicle-mounted device of the header vehicle may define a time offset parameter 1 (offset1) and a "number of subframes" for a resource of the "joining request" message, and define a time offset parameter 2 (offset2) and a "number of subframes" for a resource of the "joining response" message. Further, the time offset parameter may be defined based on a basic time unit location of a synchronization signal, or may be defined based on a start basic time unit location of a time-frequency resource, or may be defined based on a start basic time unit location of each period.

In addition, the vehicle-mounted device of the header vehicle may alternatively define only the resource of the "joining request" message, and a time interval between the "joining response" message and the "joining request" message maintains a specific offset. If the offset is a fixed offset, the vehicle-mounted device of the header vehicle does not need to indicate the offset. If the offset is a variable offset, the vehicle-mounted device of the header vehicle may indicate the offset in a master information block-sidelink (MIB-SL) (where the MIB-SL is described in detail below). A method for setting the offset for a joining message by the vehicle-mounted device of the header vehicle is not limited herein.

It should be noted that the vehicle-mounted device of the header vehicle may add a new TRP field (or field) to sidelink control information (SCI) to indicate a basic time unit location (e.g., a time-frequency resource location) to be used for several subsequent group communication transmissions, or add a TRP field to a master information block-sidelink (MIB-SL) to periodically indicate a time-frequency resource location for group communication.

In addition, there is no absolute sequence between operation 903 and operation 904 in an embodiment. Operation 903 may be performed before operation 904, or operation 904 may be performed before operation 903, or only 903 or 904 may be performed.

905. The vehicle-mounted device of the header vehicle sends control information.

After configuring the first configuration information for the vehicle-mounted device that has not joined the group, the vehicle-mounted device of the header vehicle may send the control information including the first configuration information. In an embodiment, the control information includes both the first configuration information and second configuration information, and the vehicle-mounted device of the header vehicle sends, by using the SCI and on a PSCCH, the control information included in the SCI. In an embodiment, the SCI is used to indicate a resource used by the first device for sending or receiving.

906. The vehicle-mounted device that has not joined the group sends a discovery message.

907. The vehicle-mounted device that has not joined the group sends the joining request message to the vehicle-mounted device of the header vehicle by using a third time-frequency resource.

908. The vehicle-mounted device of the header vehicle sends, by using a fourth time-frequency resource, the joining response message to the vehicle-mounted device that has not joined the group.

909. The vehicle-mounted device that has not joined the group joins the group to perform intra-group communication.

Operation 906 to operation 909 in an embodiment are similar to operation 305 to operation 308 in the foregoing embodiment. Details are not described herein again.

In an embodiment, the vehicle-mounted device of the header vehicle first allocates the time-frequency resource for group communication, and then allocates, from the time-frequency resource in a dynamic reservation manner, some resources as the first time-frequency resource of the vehicle-mounted device that has not joined the group, to transmit a joining message between the vehicle-mounted device of the header vehicle and the vehicle-mounted device that has not joined the group. Subsequently, the vehicle-mounted device of the header vehicle configures the first configuration information for the vehicle-mounted device that has not joined the group by indicating the time domain resource information of the first time-frequency resource by using the time offset parameter while indicating the time domain resource information of the time-frequency resource by using the TRP. Subsequently, the vehicle-mounted device of the header vehicle sends the control information including the first configuration information, so that the joining request message and the joining response message may be sent between the vehicle-mounted device that has not joined the group and the vehicle-mounted device of the header vehicle by using the first time-frequency resource. When the time-frequency resource is indicated, the time domain resource information of the first time-frequency resource is indicated by using the time offset parameter while the time domain resource information of the time-frequency resource is indicated by using the TRP. Therefore, in an embodiment, time-frequency resources used for indication information are further reduced while a part of the time-frequency resource is specially allocated to the vehicle-mounted device that has not joined the group to join the group. Therefore, this cannot only avoid, when the vehicle-mounted device that has not joined the group joins the group, a resource using conflict between the vehicle-mounted device that has not joined the group and the vehicle-mounted device that has joined the group, but also reduce time-frequency resources used for information indication, thereby increasing practicability of an embodiment. In addition, the vehicle-mounted device of the header vehicle allocates, in the dynamic reservation manner, the first time-frequency resource to the vehicle-mounted device that has not joined the group, where each subframe may be indicated by using only one bit. Therefore, a quantity of bits used is further reduced. A quantity of bits that can be sent on the MIB-SL is limited. Because the quantity of bits used is reduced, practicability of this solution is further improved.

The foregoing describes embodiments of the resource allocation methods, and the following describes another embodiment of a resource allocation method. It should be noted that, in the following another embodiment, operation 1001 and operation 1002 and operation 1005 to operation 1007 are similar to operation 901 and operation 902 and operation 907 to operation 909 in the foregoing embodiment. Details are not described herein again.

Figure 10:
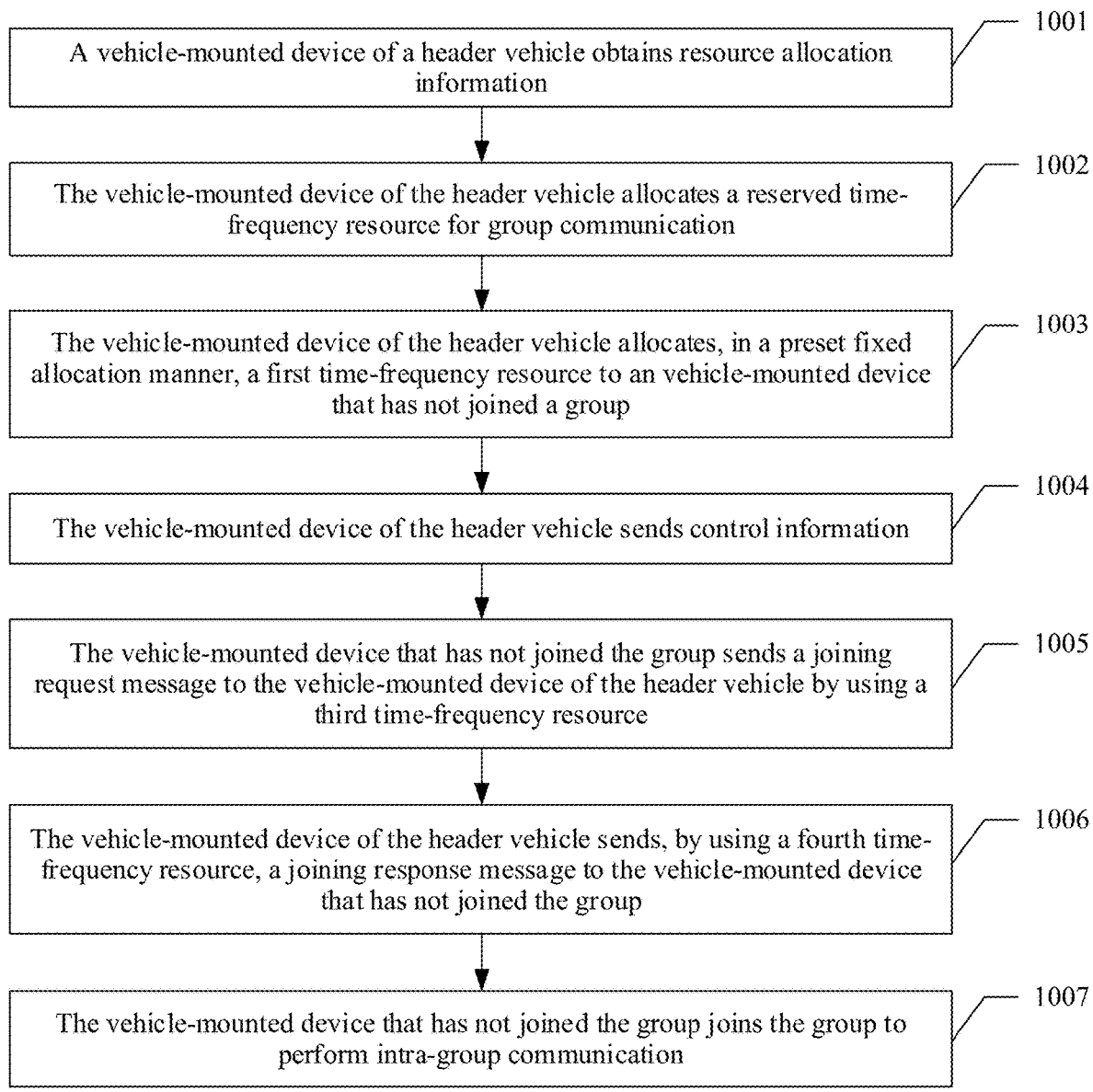
FIG. 10 is a schematic diagram of another embodiment of a resource allocation method for group communication according to an embodiment of the application.

FIG. 10 is a schematic diagram of another embodiment of a resource allocation method for group communication according to an embodiment of the application. In another embodiment, the resource allocation method for group communication includes:

1001. A vehicle-mounted device of a header vehicle obtains resource allocation information.

1002. The vehicle-mounted device of the header vehicle allocates a time-frequency resource for group communication.

1003. The vehicle-mounted device of the header vehicle allocates, in a preset fixed allocation manner, a first time-frequency resource to a vehicle-mounted device that has not joined a group.

The vehicle-mounted device of the header vehicle allocates, in the fixed manner of allocating the time-frequency resource, the first time-frequency resource to the vehicle-mounted device that has not joined the group. The vehicle-mounted device of the header vehicle specifies a resource in a fixed basic time unit for communication between the vehicle-mounted device of the header vehicle and the vehicle-mounted device that has not joined the group. In an embodiment, a basic unit of a time resource is referred to as a basic time unit (for example, a subframe defined in an LTE system, or a subframe or a slot defined in an NR system).

Specifically, the vehicle-mounted device of the header vehicle may not need to configure a parameter to indicate time domain information of specific resources for sending a "joining request" message and a "joining response" message. Instead, at least one basic time unit (for example, a resource in an $X^{th}$ time unit to a $Y^{th}$ time unit) in all reserved time-frequency resources (e.g., the first time-frequency resource and a second time-frequency resource) is used to transmit the "joining request" message by default, and at least one basic time unit (for example, a resource in a $Z^{th}$ time unit) in all the reserved time-frequency resources is used to transmit the "joining response" message by default.

It should be noted that for the vehicle-mounted device of the header vehicle, a default basic time unit location of the "joining request" message is different from a default basic time unit location of the "joining response" message. Further, the basic time unit in an embodiment may be a subframe. In this case, the "joining request" message occupies all frequency domain resources in an $X^{th}$ subframe to a $Y^{th}$ subframe, and the "joining response" message occupies all frequency domain resources in a $Z^{th}$ subframe. The $X^{th}$ subframe, the $Y^{th}$ subframe, and the $Z^{th}$ subframe are different subframes in the time-frequency resource. After reserving a time-frequency resource for a joining message by default, the vehicle-mounted device of the header vehicle no longer adjusts or allocates the time-frequency resource of the joining message.

In addition, the vehicle-mounted device of the header vehicle may also allocate the second time-frequency resource to the vehicle-mounted device that has joined the group. For example, the vehicle-mounted device of the header vehicle may allocate, in a dynamic resource reservation manner, the second time-frequency resource to the vehicle-mounted device that has joined the group. To be specific, in each period, the vehicle-mounted device of the header vehicle allocates a plurality of different subframes as the second time-frequency resource of the vehicle-mounted device that has joined the group (for example, a first subframe to a fifth subframe are allocated in a first period, an eighth subframe to a thirteenth subframe are allocated in a second period, and a tenth subframe to a fifteenth subframe are allocated in a third period), to transmit information between the vehicle-mounted device of the header vehicle and the vehicle-mounted device that has joined the group and between vehicle-mounted devices that have joined the group. The second time-frequency resource does not overlap the first time-frequency resource.

1004. The vehicle-mounted device of the header vehicle sends control information.

In an embodiment, the vehicle-mounted device of the header vehicle may send the control information by using MIB-SL. In operation 1003, the vehicle-mounted device of the header vehicle has allocated, in the preset fixed allocation manner, the first time-frequency resource to the vehicle-mounted device that has not joined the group. Therefore, a location of the allocated first time-frequency resource can be known definitely, and it is unnecessary to configure the first configuration information for the first time-frequency resource to indicate the location of the first time-frequency resource. That is, a TRP used to indicate the first time-frequency resource is not included in an embodiment.

It should be noted that, although the control information sent by using the MIB-SL does not include the first configuration information in an embodiment, the control information still includes configuration information of the time-frequency resource, and the time-frequency resource includes the first time-frequency resource and the second time-frequency resource. In an embodiment, a new field is added to the MIB-SL to represent the control information. That is, the vehicle-mounted device of the header vehicle sends, by using the MIB-SL and on a PSBCH, the control information included on the MIB-SL.

1005. The vehicle-mounted device that has not joined the group sends a joining request message to the vehicle-mounted device of the header vehicle by using a third time-frequency resource.

1006. The vehicle-mounted device of the header vehicle sends, by using a fourth time-frequency resource, a joining response message to the vehicle-mounted device that has not joined the group.

1007. The vehicle-mounted device that has not joined the group joins the group to perform intra-group communication.

In an embodiment, the vehicle-mounted device of the header vehicle allocates, in the preset fixed allocation manner, the first time-frequency resource to the vehicle-mounted device that has not joined the group, and then sends the control information by using the MIB-SL, where the control information includes only the configuration information of the time-frequency resource. After receiving the control information, the vehicle-mounted device that has not joined the group sends the joining request message for joining the group to the vehicle-mounted device of the header vehicle by using the third time-frequency resource. The vehicle-mounted device of the header vehicle sends, by using the fourth time-frequency resource, the joining response message for joining the group to the vehicle-mounted device that has not joined the group. Therefore, the vehicle-mounted device of the header vehicle and the vehicle-mounted device that has not joined the group can send a group joining message by using the dedicated time-frequency resource, so that when the vehicle-mounted device that has not joined the group uses the time-frequency resource, there is no resource using conflict between the vehicle-mounted device that has not joined the group and the vehicle-mounted device that has joined the group, and the vehicle-mounted device that has not joined the group can smoothly join the group. In addition, the vehicle-mounted device of the header vehicle allocates, in the preset fixed allocation manner, the first time-frequency resource to the vehicle-mounted device that has not joined the group. Therefore, the first configuration information that is used to indicate the first time-frequency resource does not need to be additionally configured. In this way, several bits do not need to be allocated to the first configuration information, thereby reducing a quantity of bits used. A quantity of bits that can be sent on the MIB-SL is limited. Because the quantity of bits used is reduced, practicability of this solution is improved.

The foregoing describes the embodiments of the resource allocation methods in embodiments of the application, and the following describes another embodiment of a resource allocation method. It should be noted that, in the following another embodiment, operation 1101 is similar to operation 901 and operation 1001 in the foregoing embodiments, and operation 1105 to operation 1107 are similar to operation 907 to operation 909 and operation 1005 to operation 1007 in the foregoing embodiments. Details are not described herein again.

Figure 11:
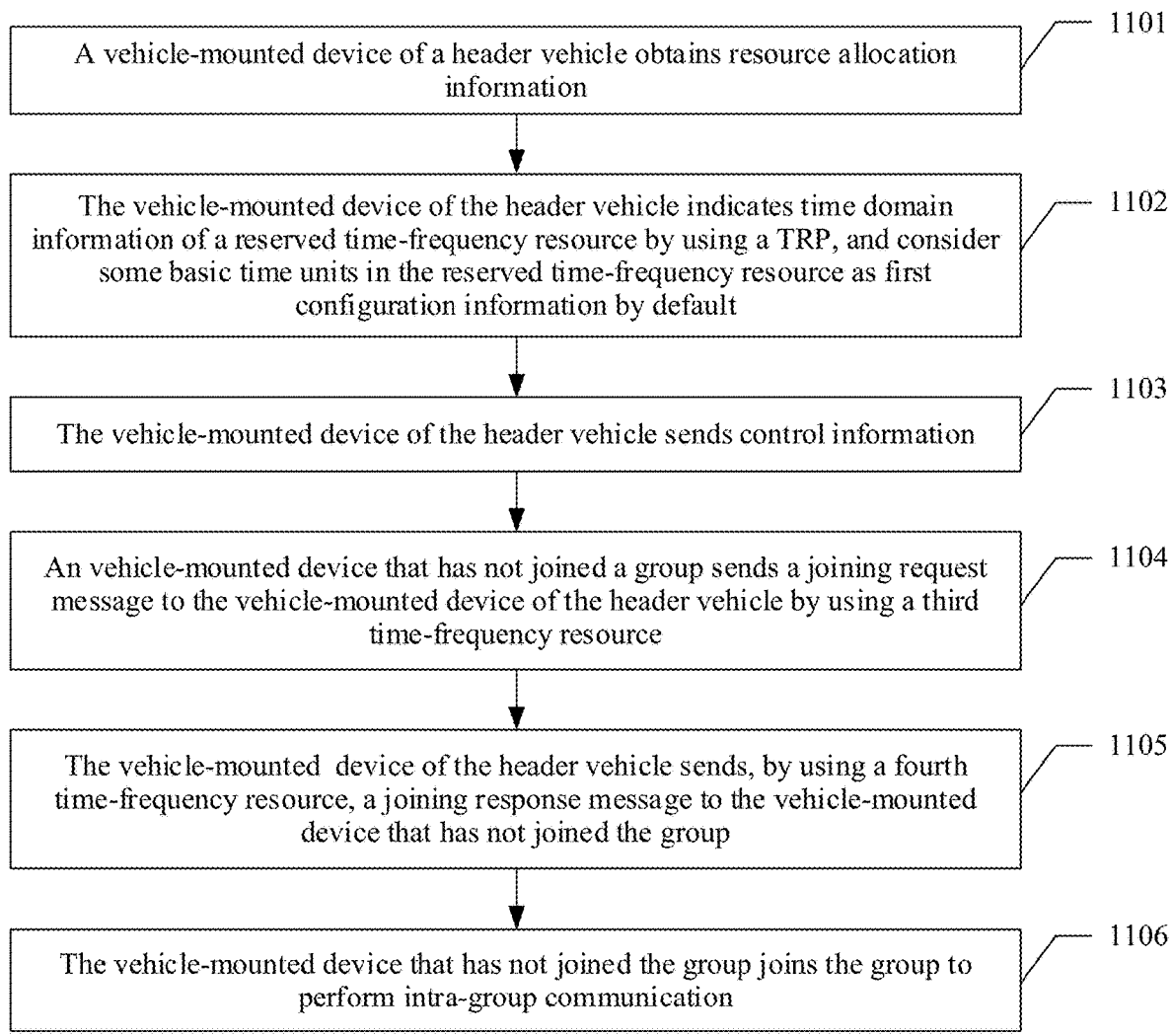
FIG. 11 is a schematic diagram of another embodiment of a resource allocation method for group communication according to an embodiment of the application.

FIG. 11 is a schematic diagram of another embodiment of a resource allocation method for group communication that includes:

1101. A vehicle-mounted device of a header vehicle obtains resource allocation information.

1102. The vehicle-mounted device of the header vehicle indicates time domain information of a time-frequency resource by using a TRP, and considers some basic time units in the time-frequency resource as first configuration information by default.

In an embodiment, the vehicle-mounted device of the header vehicle may indicate, by using the TRP, the time domain information of the time-frequency resource including a first time-frequency resource and a second time-frequency resource (e.g., configuration information used to indicate the time domain information of the time-frequency resource is configured for the time domain information). Then, some basic time units in the time-frequency resource are considered as the first configuration information by default, to indicate the time-frequency resource. In this allocation manner, the first configuration information includes only the TRP used to indicate the time-frequency resource.

In an embodiment, the basic time unit may be a subframe, or may be a basic scheduling unit. This is not limited herein.

1103. The vehicle-mounted device of the header vehicle sends control information.

In an embodiment, the vehicle-mounted device of the header vehicle may send the control information by using SCI. In operation 1102, after indicating, by using the TRP, the time domain information of the time-frequency resource including the first time-frequency resource and the second time-frequency resource, the vehicle-mounted device of the header vehicle considers some basic time units in the time-frequency resource as the first time-frequency resource by default. Therefore, the control information in an embodiment includes only the configuration information used to indicate the time domain information of the time-frequency resource.

1104. The vehicle-mounted device of the header vehicle sends a joining request message to the vehicle-mounted device of the header vehicle by using a third time-frequency resource.

1105. The vehicle-mounted device of the header vehicle sends, by using a fourth time-frequency resource, a joining response message to a vehicle-mounted device that has not joined a group.

1106. The vehicle-mounted device that has not joined the group joins the group to perform intra-group communication.

In an embodiment, after obtaining the resource allocation information, the vehicle-mounted device of the header vehicle allocates, in a semi-static reservation manner, the first time-frequency resource to the vehicle-mounted device that has not joined the group, and then sends the control information by using the SCI. The control information includes only configuration information used to indicate a time domain resource of the time-frequency resource. After receiving the control information, the vehicle-mounted device that has not joined the group sends, by using the third time-frequency resource, the joining request message for joining the group to the vehicle-mounted device of the header vehicle. The vehicle-mounted device of the header vehicle sends, by using the fourth time-frequency resource, the joining response message for joining the group to the vehicle-mounted device that has not joined the group. Therefore, the vehicle-mounted device of the header vehicle and the vehicle-mounted device that has not joined the group can send a group joining message by using the dedicated time-frequency resource, so that when the vehicle-mounted device that has not joined the group uses the time-frequency resource, there is no resource using conflict between the vehicle-mounted device that has not joined the group and a vehicle-mounted device that has joined the group, and the vehicle-mounted device that has not joined the group can smoothly join the group. In addition, some basic time units in the time-frequency resource are considered as the first configuration information by default while the TRP indicates the time-frequency resource. Therefore, a quantity of information bits used to indicate the first time-frequency resource is further reduced, thereby improving practicability of this solution.

Figure 12:
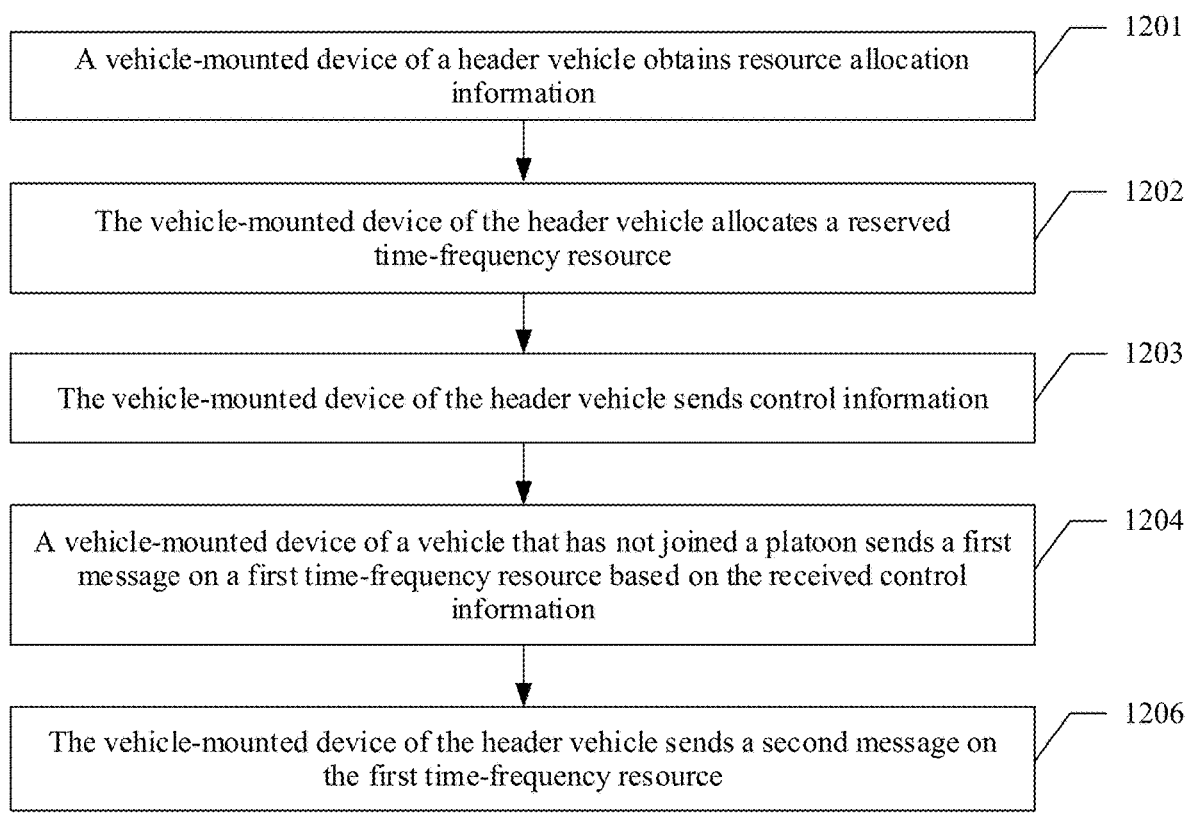
FIG. 12 is a schematic diagram of another embodiment of a resource allocation method for group communication according to an embodiment of the application.

The foregoing describes embodiments of the resource allocation methods, and the following provide another resource allocation method according to an embodiment of the application. FIG. 12 is a schematic diagram of another embodiment of a resource allocation method for group communication that includes:

1201. A vehicle-mounted device of a header vehicle obtains resource allocation information.

1202. The vehicle-mounted device of the header vehicle allocates a time-frequency resource.

The time-frequency resource may include a resource (e.g., a first time-frequency resource) for communication between the vehicle-mounted device of the header vehicle and a vehicle-mounted device of a vehicle that has not joined a platoon, and a resource (e.g., a second time-frequency resource) for communication between the vehicle-mounted device of the header vehicle and a vehicle-mounted device of a vehicle that has joined the platoon, and for communication between vehicle-mounted devices of vehicles that have joined the platoon.

1203. The vehicle-mounted device of the header vehicle sends control information.

The control information includes first configuration information, and the first configuration information is used to indicate information about the first time-frequency resource, that is, information used to indicate the resource for communication between the vehicle-mounted device of the header vehicle and the vehicle-mounted device of the vehicle that has not joined the platoon. The first configuration information may be represented in one of the following manners:

(a) Time domain information of the first time-frequency resource is indicated by using a TRP.

(b) Information about a location that is of the first time-frequency resource and that is in the time-frequency resource is indicated by an offset while time domain information of the reserved time-frequency resource including the first time-frequency resource and the second time-frequency resource is indicated by a TRP.

(c) Time domain information of the time-frequency resource including the first time-frequency resource and the second time-frequency resource is indicated by a TRP. Some basic time units in the time-frequency resource are used as the first time-frequency resource by default. In this case, the vehicle-mounted device of the header vehicle configures, only for a time domain resource of the time-frequency resource, configuration information used to indicate the time-frequency resource.

The first time-frequency resource includes a resource used by the vehicle-mounted device of the vehicle that has not joined the platoon to send a "joining request" message to the vehicle-mounted device of the header vehicle and a resource used by the vehicle-mounted device of the header vehicle to send a "joining response" message to the vehicle-mounted device of the vehicle that has not joined the platoon.

In the foregoing manner of indicating the first configuration information, the first configuration information includes only the time domain information of the first time-frequency resource. This means that all indicated available frequency domain resources in a basic time unit in a resource pool are allocated as the first time-frequency resource. Further, the vehicle-mounted device of the header vehicle may further indicate frequency domain information of the first time-frequency resource. In this case, the first configuration information includes both the time domain information of the first time-frequency resource and the frequency domain information of the first time-frequency resource.

The control information may further include information indicating whether the vehicle-mounted device of the header vehicle allocates the first time-frequency resource from the time-frequency resource, and the information is represented by one bit.

1204. The vehicle-mounted device of the vehicle that has not joined the platoon sends a first message on the first time-frequency resource based on the received control information.

1205. The vehicle-mounted device of the header vehicle sends a second message on the first time-frequency resource.

Descriptions of concepts in the foregoing operations are the same as those in the foregoing embodiments. Details are not described again.

Figure 13:
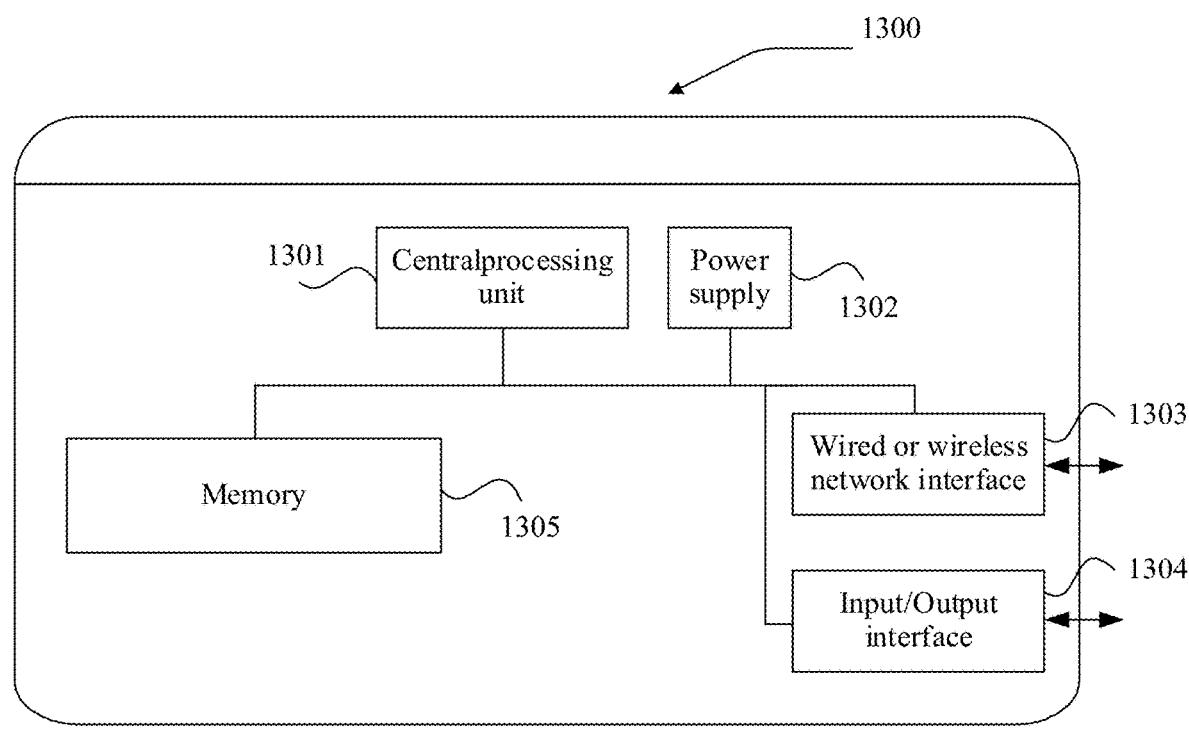
FIG. 13 is a schematic diagram of an embodiment of a communications device according to an embodiment of the application.

The foregoing describes the resource allocation methods in embodiments of the application. The following describes a communications device in at least some embodiments of the application. Referring to FIG. 13, an embodiment of a communications device is as follows:

The communications device 1300 may vary greatly because of different configurations or performance, and may include one or more central processing units (CPUs) 1301 (for example, one or more processors) and a memory 1305. The memory 1305 stores one or more application programs or data.

The memory 1305 may be volatile storage or persistent storage. The program stored in the memory 1305 may include one or more modules, and each module may include a series of instruction operations for a server. Further, the central processing unit 1301 may be configured to communicate with the memory 1305 and perform, on the communications device 1300, a series of instruction operations in the memory 1305.

The communications device 1300 may further include one or more power supplies 1302, one or more wired or wireless network interfaces 1303, one or more input/output interfaces 1304, and/or one or more operating systems such as Windows Server™, Mac OS X™, Unix™, Linux™, and FreeBSD™.

In an embodiment, a procedure performed by the central processing unit 1301 of the communications device 1300 is similar to that in the methods described in the embodiments shown in FIG. 2 to FIG. 12. Details are not described herein again.

Beneficial effects of embodiments of the application are as follows: The central processing unit 1301 can configure first configuration information for a second device, where the first configuration information is used to indicate a first time-frequency resource allocated by the communications device 1300. The first time-frequency resource is different from a second time-frequency resource allocated by the communications device 1300 to a third device in a same group. The first time-frequency resource includes a third time-frequency resource and a fourth time-frequency resource, the third time-frequency resource is a time-frequency resource used when the communications device 1300 receives a message sent by the second device, and the fourth time-frequency resource is a time-frequency resource used when the communications device 1300 sends a message to the second device. The third time-frequency resource is different from the fourth time-frequency resource. In addition, the central processing unit 1301 can send control information, where the control information includes the first configuration information. Therefore, the communications device 1300 and the first device may send a message to each other by using the dedicated third time-frequency resource and the dedicated fourth time-frequency resource, thereby avoiding a conflict with the second time-frequency resource used by the third device, ensuring that the communications device 1300 and the first device smoothly send a message by using a corresponding resource, and improving practicability of this solution.

An embodiment of the application further provides a computer storage medium, configured to store computer software instructions used by the foregoing communications device, including a program designed for the communications device for executing.

An embodiment of the application further provides a computer program product. The computer program product includes a computer software instruction, and the computer software instruction may be loaded by a processor to perform procedures in the methods in the embodiments shown in FIG. 2 to FIG. 12.

It may be clearly understood by a one of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided in the application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the application. The foregoing storage medium includes: any medium that can store program code, such as a USB flash drive, a removable hard disk, a read-only memory (ROM), a random access memory (RAM), a magnetic disk, or an optical disc.

What is claimed is:

1. A resource allocation method, comprising:
    configuring, by a first device, first configuration information for a second device, wherein the first configuration information is used to indicate a first time-frequency resource allocated by the first device, and the first time-frequency resource is different from a second time-frequency resource that is allocated by the first device to a third device in a same-group; the first time-frequency resource comprises a third time-frequency resource and a fourth time-frequency resource, the third time-frequency resource is a time-frequency resource used when the first device receives a message sent by the second device, and the fourth time-frequency resource is the time-frequency resource used when the first device sends the message to the second device; and the third time-frequency resource is different from the fourth time-frequency resource; and
    sending, by the first device, control information that comprises the first configuration information.

2. The method according to claim 1, further comprising:
    before the configuring, by the first device, the first configuration information,
    allocating, by the first device, the first time-frequency resource; or determining, by the first device, the first time-frequency resource.

3. The method according to claim 2, wherein the allocating, by the first device, the first time-frequency resource comprises:

allocating, by the first device, the time-frequency resource, wherein the time-frequency resource comprises the first time-frequency resource, or the time-frequency resource comprises the first time-frequency resource and the second time-frequency resource.

4. The method according to claim 2, wherein the allocating, by the first device, the first time-frequency resource comprises:
  allocating, by the first device, the first time-frequency resource in a semi-static reservation manner;
  or
  allocating, by the first device, the first time-frequency resource in a dynamic reservation manner;
  or
  allocating, by the first device, the first time-frequency resource in a preset fixed allocation manner.

5. The method according to claim 4, wherein the allocating, by the first device, the first time-frequency resource in a preset fixed allocation manner comprises:
  allocating, by the first device, the time-frequency resource in at least one basic time unit of the time-frequency resource as the third time-frequency resource, wherein the third time-frequency resource is used to transmit a first message, and the first message is the message sent by the second device to the first device; and
  allocating, by the first device, the time-frequency resource in at least one basic time unit of the time-frequency resource as the fourth time-frequency resource, wherein the fourth time-frequency resource is used to transmit a second message, and the second message is the message sent by the first device to the second device.

6. The method according to claim 1, wherein the configuring, by the first device, the first configuration information comprises:
  indicating, by the first device, time domain resource information of the first time-frequency resource, to configure the first configuration information for the second device.

7. The method according to claim 6, wherein the indicating, by the first device, the time domain resource information of the first time-frequency resource comprises:
  indicating, by the first device, the time domain resource information of the first time-frequency resource by using a time resource pattern (TRP), to configure the first configuration information for the second device.

8. The method according to claim 6, wherein the indicating, by the first device, the time domain resource information of the first time-frequency resource comprises:
  indicating, by the first device, a time domain resource of the first time-frequency resource, and indicating a frequency domain resource in the time domain resource of the first time-frequency resource based on the indicated time domain resource of the first time-frequency resource.

9. The method according to claim 6, wherein the indicating, by the first device, the time domain resource information of the first time-frequency resource comprises:
  indicating, by the first device, the time domain resource information of the time-frequency resource by using a time resource pattern (TRP), and indicating, by the first device, the time domain resource information of the first time-frequency resource by using a time offset parameter, wherein the time offset parameter is an offset value of a start time location of the first time-frequency resource relative to a start time location of the time-frequency resource.

10. The method according to claim 1, wherein the sending, by the first device, control information comprises:
  sending, by the first device, a MIB-SL on a broadcast channel, wherein the MIB-SL comprises the control information.

11. The method according to claim 3, wherein the control information comprises configuration information of the time-frequency resource.

12. The method according to claim 1, wherein the control information comprises second configuration information, and the second configuration information is used to indicate the second time-frequency resource.

13. The method according to claim 1, wherein the sending, by the first device, the control information comprises:
  sending, by the first device, sidelink control information (SCI), wherein the SCI comprises the control information.

14. The method according to claim 1, wherein that the fourth time-frequency resource is the time-frequency resource used when the first device sends the message to the second device comprises:
  the fourth time-frequency resource is the time-frequency resource used by the first device to send a second message to the second device in a group reply manner by using the first time-frequency resource, and there are at least two second devices.

15. The method according to claim 1, wherein that the third time-frequency resource is the time-frequency resource used when the first device receives the message sent by the second device, and the fourth time-frequency resource is the time-frequency resource used when the first device sends the message to the second device comprises:
  the third time-frequency resource is the time-frequency resource used when the first device receives a first message sent by the second device at least twice by using the first time-frequency resource, and the fourth time-frequency resource is the time-frequency resource used when the first device sends a second message to the second device once by using the first time-frequency resource.

16. A chip system comprising
  a processor, and
  a memory coupled to the processor, wherein the processor is configured to:
  configure first configuration information for a device, wherein the first configuration information is used to indicate a first time-frequency resource allocated by the processor, and the first time-frequency resource is different from a second time-frequency resource that is allocated by the processor to a third device in a group; the first time-frequency resource comprises a third time-frequency resource and a fourth time-frequency resource, the third time-frequency resource is a time-frequency resource used when the processor receives a message sent by the device, and the fourth time-frequency resource is the time-frequency resource used when the processor sends the message to the device; and the third time-frequency resource is different from the fourth time-frequency resource; and
  send control information that comprises the first configuration information.

17. The chip system of claim 16, wherein the processor is further configured to:
  before the configuring the first configuration information, allocating the first time-frequency resource; or
  determining the first time-frequency resource.

18. The chip system of claim 16, wherein the configuring the first configuration information comprises:
   indicating time domain resource information of the first time-frequency resource, to configure the first configuration information for the device.

19. The chip system of claim 16, wherein the sending control information comprises:
   sending a MIB-SL on a broadcast channel, wherein the MIB-SL comprises the control information.

20. A processing system comprising:
   at least one circuit; and a processor coupled to the at least one circuit, wherein the processor is configured to:
   configure first configuration information for a device, wherein the first configuration information is used to indicate a first time-frequency resource allocated by the processor, and the first time-frequency resource is different from a second time-frequency resource that is allocated by the processor to a third device in a group; the first time-frequency resource comprises a third time-frequency resource and a fourth time-frequency resource, the third time-frequency resource is a time-frequency resource used when the processor receives a message sent by the device, and the fourth time-frequency resource is the time-frequency resource used when the processor sends the message to the device; and the third time-frequency resource is different from the fourth time-frequency resource; and
   send control information that comprises the first configuration information.

\* \* \* \* \*

UNITED STATES PATENT AND TRADEMARK OFFICE
CERTIFICATE OF CORRECTION

| | | |
|---|---|---|
| PATENT NO. | : 11,653,332 B2 | Page 1 of 1 |
| APPLICATION NO. | : 17/059063 | |
| DATED | : May 16, 2023 | |
| INVENTOR(S) | : Yongbo Zeng, Yu Cai and Jian Wang | |

It is certified that error appears in the above-identified patent and that said Letters Patent is hereby corrected as shown below:

In the Claims

In Claim 1, Column 32, Line 47, delete "same-group" and insert --group--.

Signed and Sealed this
Eighth Day of August, 2023

*Katherine Kelly Vidal*

Katherine Kelly Vidal
*Director of the United States Patent and Trademark Office*